United States Patent
Glückstad et al.

(10) Patent No.: US 8,921,765 B2
(45) Date of Patent: Dec. 30, 2014

(54) SYSTEM FOR MANIPULATING AND OPTICALLY TARGETING MICRO OBJECTS

(71) Applicant: Danmarks Tekniske Universitet, Lyngby (DK)

(72) Inventors: Jesper Glückstad, Frederiksberg (DK); Darwin Palima, Søborg (DK)

(73) Assignee: Danmarks Tekniske Universitet, Lyngby (DK)

( * ) Notice: Subject to any disclaimer, the term of this patent is extended or adjusted under 35 U.S.C. 154(b) by 0 days.

(21) Appl. No.: 14/368,098

(22) PCT Filed: Dec. 28, 2012

(86) PCT No.: PCT/DK2012/050511
§ 371 (c)(1),
(2), (4) Date: Jun. 23, 2014

(87) PCT Pub. No.: WO2013/097869
PCT Pub. Date: Jul. 4, 2013

(65) Prior Publication Data
US 2014/0346335 A1    Nov. 27, 2014

Related U.S. Application Data

(60) Provisional application No. 61/581,276, filed on Dec. 29, 2011.

(30) Foreign Application Priority Data

Dec. 29, 2011   (EP) .................................... 11196097

(51) Int. Cl.
H01S 1/00    (2006.01)
H01S 3/00    (2006.01)
H05H 3/02    (2006.01)
G21K 1/00    (2006.01)

(52) U.S. Cl.
CPC ........................................ *G21K 1/00* (2013.01)
USPC ........ 250/251; 250/458.1; 356/326; 356/317; 356/300; 356/311; 359/298; 359/368; 359/619; 359/626; 359/291

(58) Field of Classification Search
USPC ............... 250/251, 458.1; 356/326, 317, 300, 356/311; 359/298, 368, 619, 626, 291
See application file for complete search history.

(56) References Cited

U.S. PATENT DOCUMENTS 7,622,710 B2 *   11/2009   Gluckstad ..................... 250/251

OTHER PUBLICATIONS

Maruyama Hisataka, Iitsuka Ryo, Onda Kazuhisa, Arai Fumihito, "Massive Parallel Assembly of Microbeads for Fabrication of Microtools Having Spherical Structure and Powerful Laser Manipulation", 2010 IEEE Int. Conf. on Robotics and Automation, May 3-8, 2010, Anchorage , Alaska.*

*Primary Examiner* — Nikita Wells
*Assistant Examiner* — Meenakshi Sahu
(74) *Attorney, Agent, or Firm* — Knobbe Martens Olson & Bear LLP

(57) ABSTRACT

The present invention relates to a system 100 for independently holding and manipulating one or more microscopic objects 158 and for targeting at least a part of the one or more microscopic objects within a trapping volume 102 with electromagnetic radiation 138. The system comprises trapping means for holding and manipulating the one or more microscopic objects and electromagnetic radiation targeting means (116). The light means comprising a light source and a spatial light modulator which serve to modify the light from the light source so as to enable specific illumination of at least a part of the one or more microscopic objects. The trapping means and the electromagnetic radiation targeting means (116) are enabled to function independently of each other, so that the trapped objects may be moved around without taking being dependent on which parts are being targeted and vice versa.

19 Claims, 8 Drawing Sheets

US 8,921,765 B2

SYSTEM FOR MANIPULATING AND OPTICALLY TARGETING MICRO OBJECTS

CROSS REFERENCE TO RELATED APPLICATIONS

This application is a U.S. National Phase Application of PCT International Application Number PCT/DK2012/050511, filed on Dec. 28, 2012, designating the United States of America and published in the English language, which is an International Application of and claims the benefit of priority to European Patent Application No. 11196097.7, filed on Dec. 29, 2011, and U.S. Provisional Application No. 61/581,276, filed on Dec. 29, 2011. The disclosures of the above-referenced applications are hereby expressly incorporated by reference in their entireties.

FIELD OF THE INVENTION

The present invention relates to a system for optically targeting micro objects, and more specifically to a system and method for manipulating and optically targeting micro objects, and corresponding use of such system.

BACKGROUND OF THE INVENTION

Within the field of investigating, manipulating or analysing microscopic objects it is of constant appeal to be able to improve the instruments used to gain information about the examined objects or for manipulating the objects.

The reference WO2009/002537 discloses methods and devices which are provided for the trapping, including optical trapping; analysis; and selective manipulation of particles on an optical array. A device parcels a light source into many points of light transmitted through a microlens optical array and an Offner relay to an objective, where particles may be trapped. Preferably the individual points of light are individually controllable through a light controlling device. Optical properties of the particles may be determined by interrogation with light focused through the optical array. The particles may be manipulated by immobilizing or releasing specific particles, separating types of particles, etc.

Regardless of the progress made, there still exists a desire in the field to be able to enhance the capabilities of the equipment used.

Hence, an improved device and method for investigating, manipulating or analysing microscopic objects would be advantageous, and in particular a more efficient, reliable, simple device and method would be advantageous.

SUMMARY OF THE INVENTION

It is a further object of the present invention to provide an alternative to the prior art.

In particular, it may be seen as an object of the present invention to provide a system for independently holding and manipulating a plurality of microscopic objects and for targeting at least a part of the plurality of microscopic objects that solves the above mentioned problems of the prior art with providing a more efficient, reliable, simple device and method.

Thus, the above described object and several other objects are intended to be obtained in a first aspect of the invention by providing a system for independently holding and manipulating a plurality of microscopic objects and for targeting at least a part of the plurality of microscopic objects within a trapping volume with electromagnetic radiation, the system comprising
    trapping means for holding and manipulating the plurality of microscopic objects within the trapping volume,
    electromagnetic radiation targeting means, the electromagnetic radiation targeting means comprising
        a targeting electromagnetic radiation source for emitting targeting electromagnetic radiation,
        a primary spatial electromagnetic radiation modulator for receiving and spatially shaping the targeting electromagnetic radiation so as to generate modulated targeting electromagnetic radiation directed towards at least a part of the plurality of microscopic objects so as to enable specifically targeting at least a part of the plurality of microscopic objects within the trapping volume,
    wherein the trapping means and the electromagnetic radiation targeting means are enabled to function independently of each other, and wherein the electromagnetic radiation targeting means enables independently targeting at least two spatially different microscopic objects, and wherein the trapping means and the electromagnetic radiation targeting means are spatially separated.

The invention is particularly, but not exclusively, advantageous for providing a system which enables simultaneous trapping and targeting of micro objects, wherein the trapping and targeting may work in an independent and dynamic manner, such that the trapping (i.e., holding and manipulation of the micro objects) may be varied in time, and where the targeting, i.e., shining electromagnetic radiation, such as light, onto specific parts of the microscopic objects in a corresponding dynamic manner. A possible advantage is that this enables a simple, yet efficient setup for dynamically manipulating and targeting a microscopic object, and in particular it enables a simple, yet efficient setup for dynamically manipulating and targeting a plurality of microscopic objects.

By 'holding and manipulating' is understood that microscopic objects may be held in a certain position and/or moved and/or rotated, such as is generally known from optical traps. However, the invention is not limited to optical traps, the trapping means is also contemplated to be embodied in the form of magnetic tweezers, magneto-optical traps, sono-tweezing using ultra-sound transducers or traps relying on dielectrophoresis or other trapping schemes known to the person skilled in the art.

'Electromagnetic radiation' (EMR) is well-known in the art. EMR is understood to include various types of electromagnetic variation, such as various types corresponding to different wavelength ranges, such as radio waves, microwaves, infrared radiation, EMR in the visible region (which humans perceive or see as 'light'), ultraviolet radiation, X-rays and gamma rays. The term optical is to be understood as relating to light. EMR is also understood to include radiation from various sources, such as incandescent lamps, LASERs and antennas. It is commonly known in the art, that EMR may be quantized in the form of elementary particles known as photons. In the present application, the terms 'light' and 'optical' is used for exemplary purposes. It is understood, that where 'light' or 'optical' is used it is only used as an example of EMR, and the invention is understood to be applicable to also other wavelength intervals where reference is made to 'light' or 'optical'.

By 'targeting' is understood specifically illuminating a microscopic object or a part of an object, such as a microscopic object, with EMR, such as light. It is understood, that the targeting light may in particular embodiments not be able to optically trap, hold, move or manipulate the microscopic objects. In particular embodiments, the electromagnetic radiation targeting means may not be able to overcome the forces applied by the trapping system. In consequence, a microscopic object which is trapped by the trapping system will remain trapped regardless of the actions of the electromagnetic radiation targeting means. It may be understood, that a microscopic object which is trapped by the trapping system will remain in a spatially stationary position, such as in the same position with respect to the three geometrical axes (commonly referred to as the x, y and z axes), such as with respect to any rotational axes (such as rotations around the x, y and z axes), regardless of the actions of the electromagnetic radiation targeting means.

According to an embodiment, there is provided a system for independently holding and manipulating a plurality of microscopic objects and for targeting at least a part of the one or more microscopic objects within a trapping volume with electromagnetic radiation, the system comprising trapping means for holding and manipulating the plurality of microscopic objects within the trapping volume, wherein the trapping means is an optical trapping means comprising a trapping electromagnetic radiation source for emitting trapping electromagnetic radiation, a secondary spatial electromagnetic radiation modulator for receiving and spatially shaping the trapping electromagnetic radiation so as to generate modulated trapping electromagnetic radiation which may be directed towards the plurality of microscopic objects, electromagnetic radiation targeting means (116), the electromagnetic radiation targeting means comprising a targeting electromagnetic radiation source (118) for emitting targeting electromagnetic radiation (132), a primary spatial electromagnetic radiation modulator (120) for receiving and spatially shaping the targeting electromagnetic radiation so as to generate modulated targeting electromagnetic radiation (136) directed towards at least a part of the plurality of microscopic objects so as to enable specifically targeting at least a part of the plurality of microscopic objects within the trapping volume, wherein the trapping means and the electromagnetic radiation targeting means (116) are enabled to function independently of each other, and wherein the electromagnetic radiation targeting means enables independently targeting at least two spatially different microscopic objects, and wherein the trapping means and the electromagnetic radiation targeting means are spatially separated.

An advantage of this embodiment may be that it enables independently trapping and targeting a plurality of microscopic objects, such as 100 or more microscopic objects, and furthermore enables trapping and/or targeting the microscopic objects in a trapping volume wherein neither the trapped microscopic objects nor the targeted microscopic objects need to be confined to a plane, but may be dispersed throughout the trapping volume.

In an embodiment of the invention, there is provided a system, wherein the electromagnetic radiation targeting means and the trapping means are arranged so that the electromagnetic radiation targeting means may not be able to overcome the forces applied by the trapping system. An advantage of this may be, that the trapped microscopic objects remain trapped regardless of whether they are targeted or not. For example, a microscopic object, e.g., in the form of a spherical bead, which is trapped by the trapping means may simultaneously be targeted with modulated targeting EMR while still remaining trapped by the trapping means.

By 'specifically illuminating' is understood that the illumination is confined to a small region, such as a microscopic region, such as a region of less than 10000 square micron, such as less than 1000 square micron, such as less than 100 square micron, such as less than 90 square micron, such as less than 80 square micron, such as less than 70 square micron, such as less than 60 square micron, such as less than 50 square micron, such as less than 40 square micron, such as less than 30 square micron, such as less than 20 square micron, such as less than 10 square micron, such as less than 5 square micron, such as less than 1 square micron.

By 'trapping volume' is understood a region, such as a three-dimensional region, wherein microscopic objects may be held and manipulated by the trapping system. In particular embodiments, the invention further comprises a sample stage for holding a sample, such as a liquid sample while still retaining access to the sample for the trapping means and the EMR targeting means. The trapping volume may in different embodiments have different sizes, such as each of a height-depth-width, being any one of 1-10000 micrometer, such as 1-1000 micrometer, such as 1-100 micrometer, such as 1-10 micrometer, such as 10-10000 micrometer, such as 10-1000 micrometer, such as 10-100 micrometer. In a particular embodiment, the trapping volume is smaller than or equal to 100×100×100 cubic micrometer, such as substantially equal to 100×100×100 cubic micrometer, such as equal to 100×100×100 cubic micrometer.

By 'microscopic object' is understood an object of microscopic dimensions, such as particles, beads or micro devices having lengths, width and height within a range from 1 nanometer to 1 millimeter, such as within a range from 1 nanometer to 100 micrometers, such as within a range from 1 nanometer to 10 micrometers, such as within a range from 1 nanometer to 1 micrometer. It is further understood, that multiple microscopic objects may, or may not be, linked together via structural elements, such as a rod or a bar. For example, multiple microscopic objects may be joined together and form a micro device, as is shown in the appended figures (such as FIGS. 2, 9, 10, 14, 15). Individual microscopic objects may for example function as optical handles, such as a plurality of microscopic objects functioning as optical handles for a single micro device which may for a structural entity. It is also understood that a micro device may itself be referred to as a microscopic object.

By 'electromagnetic radiation targeting means' is understood means for targeting at least a part of the plurality of microscopic objects with EMR, such as specifically illuminating one or more distinct regions on one or more microscopic objects within the trapping volume, where region is understood to be a two-dimensional area extending in a plane being orthogonal to an optical axis along a direction of propagation of the modulated targeting EMR.

By 'targeting electromagnetic radiation source for emitting targeting electromagnetic radiation' is understood a source of EMR which is suited for emitting EMR, which may be used, after having been spatially modulated by the primary spatial electromagnetic radiation modulator, for targeting.

By 'primary spatial electromagnetic radiation modulator' and/or 'secondary spatial electromagnetic radiation modulator' is understood a spatial light modulator (SLM) as is known in the art. It is understood that the primary spatial EMR modulator and/or the secondary spatial EMR modulator may be provided in a number of embodiments including embodiments with movable parts, such as one or more movable mirrors, or embodiments with spatially distributed and electrically addressable elements which change their properties in terms of optical path length, transmittance, and/or reflectivity upon activation. The spatial variations of optical characteristic across the primary spatial EMR modulator and/or the secondary spatial EMR modulator may in specific embodiments be known as a hologram. In a particular embodiment, there is provided a system, wherein the primary spatial EMR modulator (and/or the secondary spatial EMR modulator) comprises diffractive optics (which is described in the reference WO2003/034118 A1 which is hereby incorporated by reference in entirety). In a particular embodiment, the primary spatial EMR modulator (and/or the secondary spatial EMR modulator) comprises a system for providing diffractive beam shaping, such as a system for diffractive optics, such as a system for Fourier holography, such as a system for Fresnel holography, such as a system for holographic optical scattering. Advantages of employing diffractive optics may include compactness in the setup with few additional optical elements required.

In an embodiment there is provided a system, wherein the trapping means comprises a setup relying on a Generalized Phase Contrast (GPC). In an embodiment there is provided a system, wherein the electromagnetic targeting means comprises a setup relying on a Generalized Phase Contrast (GPC). In an embodiment there is provided a system, wherein the trapping means comprises a setup relying on holography. In an embodiment there is provided a system, wherein the electromagnetic targeting means comprises a setup relying on holography. It is understood that GPC and holography may each be seen as advantageous in that they each may serve to enable dynamic trapping respectively targeting microscopic objects in three dimensions (3D).

By 'spatially shaping' is understood that the properties of the EMR beam, such as the light beam, such as the direction, intensity, phase or other parameters is changed by the spatial EMR modulator, such as the primary and/or secondary EMR modulator. In a more particular embodiment, it is understood that the intensity and/or phase profile of the targeting electromagnetic radiation is changed by the spatial EMR modulator.

By 'modulation' of EMR is understood that the direction, intensity, phase or other parameters of the EMR is changed, such as changed with respect to time so that microscopic objects which change position (such as being moved by the trapping means) over time may be targeted or trapped, such as followed in space by the targeting and/or trapping means over time.

According to some embodiments of the invention the primary spatial electromagnetic radiation modulator and/or the secondary spatial EMR modulator is configured for providing a modulated EMR beam, such as modulated light beam, having a substantially flat intensity profile but non-flat phase profile. In particular embodiments, the primary spatial electromagnetic radiation modulator and/or the secondary spatial EMR modulator is configured for providing a phase-only modulation wherein only the phase varies across a spatial electromagnetic radiation modulator (i.e., non-flat phase-profile). In particular embodiments, all other optical characteristics are substantially constant across the modulator. In particular exemplary embodiments of the present invention the spatial light modulator is approximated by a phase-only modulation of an input laser beam in a discrete pixel matrix. Phase-only modulation allows the entire incoming beam power to be diffractively distributed between the stimulation points with minimal power loss.

According to some embodiments of the invention the primary spatial electromagnetic radiation modulator and/or the secondary spatial EMR modulator is configured for providing amplitude-only modulation.

According to some embodiments of the invention the primary spatial electromagnetic radiation modulator (and/or the secondary spatial EMR modulator) is configured for generating targeting electromagnetic radiation, such as modulated targeting EMR (respectively configured for generating trapping EMR, such as modulated trapping EMR) having a substantially non-flat phase profile and/or a non-flat amplitude profile with respect to the targeting electromagnetic radiation emitted from the targeting electromagnetic radiation source (respectively with respect to the trapping electromagnetic radiation emitted from the trapping electromagnetic radiation source).

According to some embodiments of the invention the primary spatial electromagnetic radiation modulator and/or the secondary spatial EMR modulator is configured for providing concurrent phase and amplitude modulation, such as by means of two spatial modulation-subunits arranged for allowing concurrent phase and amplitude modulation of the incoming beam.

According to some embodiments, the optics is shared between the electromagnetic radiation targeting means and the trapping means, such as the trapping means being an optical trapping means and a path of rays from the trapping means traverses the optics and a path of rays from the electromagnetic radiation targeting means traverses the optics.

According to some embodiments of the invention the primary spatial electromagnetic radiation modulator and/or the secondary spatial EMR modulator is configured for providing spatial polarization modulation.

It is noted that the spatial modulation of the primary electromagnetic radiation, such as the targeting EMR, and/or the secondary EMR, such as the trapping EMR, can be done by a spatial electromagnetic radiation modulator, such as described in the reference "Real-time interactive 3D manipulation of particles viewed in two orthogonal observation planes", Ivan R. Perch-Nielsen, Peter John Rodrigo, and Jesper Glückstad, 18 Apr. 2005/Vol. 13, No. 8/OPTICS EXPRESS 2852, the contents of which are hereby incorporated by reference. It is understood, that 'targeting EMR' is used interchangeably with 'primary EMR' and that 'trapping EMR' is used interchangeably with 'secondary EMR'. In general, the spatial modulation could be carried out with known spatial light modulators including Liquid Crystal SLMs (LC-SLMs), Micro Electro-Mechanical Systems SLMs (MEMS-SLMs), deformable mirror SLMs, Acousto-Optic SLMs (AO-SLMs), or other types of SLMs. The point is that the targeting EMR and/or trapping EMR may be spatially modulated in a dynamic time framework (spatio-temporal context so to speak). It is further understood, that the SLM may be operated so as to generate multiple independent beams of electromagnetic radiation, so as to enable providing modulated targeting electromagnetic radiation and/or modulated trapping EMR comprising multiple separate beams of EMR directed towards at least a part of the plurality of microscopic objects so as to enable specifically targeting, respectively trapping, such as targeting and/or trapping, at least two spatially different microscopic objects. For example, the system may then be enabled to target and/or trap a distinct microscopic object on a first micro device and another distinct microscopic object on the same or another micro device, while any object between or outside of the two distinct microscopic objects may not be targeted and/or trapped, and where each of the specifically targeted and/or trapped distinct microscopic objects may move in space with respect to time independent of the other specifically targeted and/or trapped distinct microscopic object. In a particular embodiment, the at least two spatially different microscopic objects are or may be targeted, respectively trapped, simultaneously. A possible advantage of simultaneous targeting, respectively trapping, may be that it provides a more simple system, since there is no need to switch from targeting, respectively trapping, one microscopic object to targeting, respectively trapping, another microscopic object. Another possible advantage may be that the time averaged intensity of targeting and/or trapping illumination for each targeted and/or trapped microscopic object may be higher, in particular for similar peak intensity. It is also understood that the targeting means may enable targeting a microscopically sized region on any object, including objects being larger than microscopic objects, where the region is understood to be an area which is a two-dimensional area extending in a plane being orthogonal to an optical axis along a direction of propagation of the modulated targeting EMR.

By 'the trapping means and the electromagnetic radiation targeting means are enabled to function independently of each other' is understood, that the trapping means may be operated independently, i.e., the microscopic objects may be spatially held and manipulated independently of which objects may or may not be targeted. Similarly, the EMR targeting means may be operated independently from the trapping means, i.e., the targeting of the microscopic objects may be carried out independently of which object may or may not be spatially held and manipulated by the trapping means.

By 'micro device' is understood is understood a device on the scale of micrometers, such as a device having length, width and height within a range from 1 micrometer to 1 millimeter. The micro device is understood to have a function, e.g., having a tip able to penetrate a cell, be chemically functionalized, have optical elements capable of shaping EMR, such as light, or other functions. In particular embodiments, the micro device comprises a number of optical handles, such as beads, such as a plurality of optical handles, which enables controlling the micro device spatially, such as controlling with 3, 4, 5, or 6 degrees of freedom.

By 'translational movement' is understood movement where the microscopic object is moved from a first position in space to a second position in space. It is understood that there are three spatial dimensions (corresponding to three axis—x, y, and z—in a Cartesian coordinate system), and translational movement in three dimensions thus corresponds to enabling movement in all directions.

By 'rotational movement' is understood movement where the microscopic object is rotated—a certain angle—around its own centre of gravity. It is understood that there are three spatial dimensions (corresponding to three axis—x, y, and z—in a Cartesian coordinate system), and rotational movement in three dimensions thus corresponds to enabling movement around all axes. Control over rotational movement of a device around at least two axes means that the rotation of the device around 2 axes is controlled, while rotation of the device around the last axis is not necessarily controlled.

The 'trapping means' is understood to be means for enabling non-contact spatial control over a microscopic object in terms of translational movement in a least one dimension, such as two dimensions, such as three dimensions. In a specific embodiment, the trapping means enables control over a microscopic object in terms of translational movement in three (translational) dimensions, such as along the three geometrical axes (commonly referred to as the x, y, and z axes). This may be advantageous since it allows placing the microscopic object in any position, such as any position within the trapping volume. The microscopic object need thus not be confined to, e.g., certain line (1D) or a certain plane (2D). In specific embodiments, the trapping means enables control over a microscopic object in terms of translational movement in three (translational) dimensions and rotational movement around at least two axes, which may alternatively be formulated as means for enabling simultaneous control over 3 translational degrees of freedom and 2 rotational degrees of freedom, i.e., a total of 5 degrees of freedom. This may be advantageous since it allows placing the microscopic object in any position and any orientation. For example, a micro device as described in FIGS. 2-3 below may be moved around a human cell while always being oriented toward the centre of the cell, such as having the EMR emitting unit pointing toward the centre of the cell. In particular embodiments, said means may be embodied in the form of EMR controllable handles, such as optical handles.

A light ray is mathematically described as a one-dimensional mathematical object. As such, a light ray intersects any surface which is not parallel to the light ray at a point. 'Light ray' and 'EMR ray' are used interchangeably in this application.

A light beam may be described as one or more light rays. A light beam therefore intersects a surface which is not parallel to the beam at a plurality of points, one point for each light ray of the beam. Generally, a profile of the light beam refers to an optical characteristic (intensity, phase, polarization, frequency, brightness, hue, saturation, etc.) or a collection of optical characteristics of the locus of all such intersecting points. Typically, but not obligatorily, the profile of the light beam is measured at a planar surface which is substantially perpendicular to the propagation direction of the light. A light beam may be understood as being spatially limited in directions being orthogonal to the direction of propagation, such as the light intensity being substantially zero outside of the light beam. For example, a Gaussian light beam may have a non-zero light intensity in the center of the beam, whereas the intensity decreases with distance (in directions being orthogonal to the direction of propagation) from the center of the beam, so as to be substantially zero, such as zero, far away from the beam centre. Multiple light beams may be understood to be light beams which may be spaced so that the light intensity between the light beams is much smaller than the light intensity in the light beam centres. 'Light beam' and 'EMR beam' are used interchangeably in this application.

The locus of points at which all light rays of the beam has the same phase is referred to as the wavefront of the beam. For a collimated light beam, for example, the wavefront is a plane perpendicular to the propagation direction of the light, and the light is said to have a planar wavefront.

Thus, the term "profile" is used to optically characterize the light beam at its intersection with a given surface, while the term "wavefront" is used to geometrically characterize a surface for a given phase.

A profile relating to a specific optical characteristic is referred to herein as a specific profile and is termed using the respective characteristic. Thus, the term "intensity profile" refers to the intensity of the locus of all the intersecting points, the term "phase profile" refers to the phase of the locus of all the intersecting points, the term "frequency profile" refers to the frequency of the locus of all the intersecting points, and so on. Similarly to the general profile function, a specific profile function can also be represented by a two-dimensional function.

The 'targeting EMR source' is a source of electromagnetic radiation and may in particular embodiments be a laser light source. For example, the targeting EMR source can be a monochromatic laser light source or a combination of several monochromatic laser light sources. Lasers which are not strictly monochromatic are also contemplated. When several lasers are employed, they can operate simultaneously or in a time-multiplexed manner. By 'white light laser' is meant a super continuum light source.

The trapping means may be arranged for holding and manipulating a plurality of microscopic objects. Trapping of multiple microscopic objects, such as 2, 3, 4, 5, 6, 7, 8, 9, 10, 100 or 1000 microscopic objects, such as micro devices, may in particular be advantageous in situations where each of the microscopic objects is carrying out a function, such as scanning of the surface, such as the plurality of microscopic objects carrying out a parallel scanning of a surface, since this may accelerate the particular process by a factor scaling with the number of microscopic objects. Trapping of multiple microscopic objects may also be advantageous in situations where the multiple microscopic objects are carrying out different functions which do not merely add up to a juxtaposition of effects, for example if the microscopic objects are working together, for example to both hold, manipulate and optically scan an object, such as a human cell, such as multiple objects, such as multiple cells.

In an embodiment there is provided a system, wherein the trapping means enables independently trapping at least 100 microscopic objects, such as at least 200, 500, 750 or 1000 microscopic objects. This may be seen as an advantage, since it enables trapping more microscopic objects than would otherwise have been possible using, e.g., time-sharing of a mechanically rotatable mirror. The present embodiment may be realized, for example, by using a spatial light modulater, such as an electrically or optically addressed spatial light modulator which enables changing its properties locally, such as a GPC setup as described elsewhere in the present application.

In some embodiments, there may be a plurality, such as 2, 3, 4, 5, 6, 7, 8, 9, 10, 100, 1000 or more modulated trapping EMR beams for trapping, such as for trapping a corresponding number of microscopic objects. The microscopic objects being trapped may be distributed within one dimension, such as along a straight line, or within two dimensions, such as on a plane, or within three dimensions, such as not being confined to being positioned on a line (1D) or on a plane (2D). According to this embodiment, a plurality of spatially different microscopic objects may be trapped simultaneously where a modulated trapping EMR beam is dedicated to each micro object. A possible advantage of simultaneous trapping may be that it provides a more simple system, since there is no need to switch from trapping one microscopic object to trapping another microscopic object. Another possible advantage may be that the time averaged intensity of the modulated trapping EMR for each trapped microscopic object may be higher, in particular for similar peak intensity.

According to another embodiment of the invention, there is provided a system wherein the electromagnetic radiation targeting means is arranged for targeting a plurality of parts on the plurality of microscopic objects. In analogy with the above paragraph, targeting a plurality of parts on the plurality of microscopic objects may be advantageous for accelerating processes and/or for enabling hitherto impossible processes, such as simultaneous scanning of different regions on a microscopic object.

In some embodiments, there may be a plurality, such as 2, 3, 4, 5, 6, 7, 8, 9, 10, 100, 1000 or more modulated targeting EMR beams for targeting, such as targeting a corresponding number of microscopic objects, such as a number of regions within the trapping volume, such as being focused at a plurality of spatially distributed focus points within the trapping volume. The focus points may be distributed within one dimension, such as along a straight line, or within two dimensions, such as on a plane, or within three dimensions, such as not being confined to being positioned on a line or on a plane.

In an embodiment, there is provided a system wherein the electromagnetic targeting means enables independently targeting at least 100 microscopic objects, such as at least 200, 500, 750 or 1000 microscopic objects. This may be seen as an advantage, since it enables targeting more microscopic objects than would otherwise have been possible using, e.g., time-sharing of a mechanically rotatable mirror. The present embodiment may be realized, for example, by using a spatial light modulater, such as an electrically or optically addressed spatial light modulator which enables changing its properties locally, such as a GPC setup as described elsewhere in the present application.

By 'the trapping means and the electromagnetic radiation targeting means are spatially separated' is understood that the trapping means and the EMR targeting means occupy different positions in space. It is in particular understood that the physical element (or elements) of the trapping means which are enabling that the position of the trapped microscopic objects may vary with respect to time and the EMR light modulator (which is enabling that the modulated targeting electromagnetic radiation may vary in space with respect to time) are spatially separated. It is also understood, however, that the trapping means and the electromagnetic radiation targeting means may, share certain elements, in particular elements which are stationary, such as a processor for controlling their operation or such as a microscope objective.

According to an embodiment of the invention, there is provided a system wherein the trapping means comprises a trapping spatio-temporal unit enabling varying the position of the plurality of microscopic objects, and wherein the trapping spatio-temporal unit and the primary electromagnetic radiation modulator are spatially separated. The 'spatio-temporal unit' is understood to be a physical element (or physical elements) of the trapping means which is (are) enabling that the position of the trapped microscopic objects may vary with respect to time. In a particular embodiment, the trapping means is an optical trapping means comprising a secondary spatial electromagnetic radiation modulator, where the secondary spatial electromagnetic radiation modulator is understood to be a spatio-temporal unit. In another example, the spatio-temporal unit is one or more movable mirrors.

According to an embodiment of the invention, there is provided a system wherein the trapping means is an optical trapping means.

An advantage of employing optical trapping means may be that it is a relatively fast, versatile and precise. A microscopic object may be moved with a resolution of less than 100 micron, such as less than 10 micron, such as less than 1 micron, such as less than 100 nanometer, such as less than 10 nanometer, such as less than 1 nanometer.

According to an embodiment of the invention, there is provided a system wherein the trapping means is an optical trapping means comprising
    a trapping electromagnetic radiation source for emitting trapping electromagnetic radiation,
    a secondary spatial electromagnetic radiation modulator for receiving and spatially shaping the trapping electromagnetic radiation so as to generate modulated trapping electromagnetic radiation which may be directed towards the plurality of microscopic objects.

Optical trapping means are generally known in the art, and understood to comprise optical tweezers, such as scanning optical tweezers, such as holographic optical tweezers (see the reference "Holographic optical tweezers and their relevance to lab on chip devices", M. Padgett and R. Leonardo, Lab Chip, 2011, 11, 1196, which is hereby incorporated by reference). In a particular embodiment, the optical trapping means is embodied by a setup relying on the Generalized Phase Contrast (GPC) platform. It is contemplated to use any kind of GPC setup, including GPC (which is described in the reference WO1996/034307 which is hereby incorporated by reference in entirety), analog GPC (which is described in the reference WO2009/036761 A1 which is hereby incorporated by reference in entirety), Matched filtering GPC (which is described in the reference WO2007/147497 A1 which is hereby incorporated by reference in entirety), 3D-GPC (which is described in the reference WO2005/096115 which is hereby incorporated by reference in entirety), multifilter GPC (which is described in the reference WO2004/113993 which is hereby incorporated by reference in entirety) and a MOEMS-platform (which is described in the reference WO2006/097101 A1 which is hereby incorporated by reference in entirety). The secondary spatial EMR modulator may be a spatial light modulator (SLM) which is described elsewhere in the present application. In particular, it is understood that the secondary spatial electromagnetic radiation modulator may in particular embodiments apply a spatial modulation of the incident electromagnetic radiation by changing its properties locally, such as an electrically or optically addressed spatial light modulator. The trapping EMR source for emitting trapping EMR may be a light source, such as a LASER source.

It is understood that the trapping EMR source and the targeting EMR source may in particular embodiments be the same EMR source, such as a single light source, such as a single laser source. In such embodiments, the EMR from the light source, such as a laser beam, may be split, e.g., using a dichroic mirror.

In other particular embodiments the trapping EMR source and the targeting EMR source may be different EMR sources, such as different lasers, such as the trapping EMR source and the targeting EMR source being EMR sources emitting EMR at different wavelengths and/or power levels.

In a particular embodiment, the optical trapping means is arranged for employing counter propagating beams. Advantages of using counter propagating beams may include that the requirements for focusing are less demanding and/or that the trapping volume may be larger and/or a working distance may be larger, in particular in a direction parallel with a direction of propagation of the beam(s).

The power of any one of the targeting EMR source and the trapping EMR source may be within 1 mW to 1000 W, such as within 1 mW to 100 W, such as within 1 mW to 10 W, such as within 1 mW to 1 W, such as within 10 mW to 1000 W, such as within 100 mW to 1000 W, such as within 1 W to 1000 W, such as within 10 W to 1000 W, may be within 100 mW to 100 W, may be within 100 mW to 10 W, may be within 100 mW to 1 W, may be within 10 mW to 100 W, may be within 100 mW to 100 W, may be within 1 W to 100 W, may be within 10 W to 100 W.

According to a further embodiment of the invention, there is provided a system wherein the primary and secondary spatial electromagnetic radiation modulators are physically separated. According to this embodiment, the primary and secondary spatial electromagnetic radiation modulators are spatially separated, which embodies a simple scheme for allowing them to function independently of each other. An advantage of this may be that it simplifies operation of the primary and/or secondary spatial EMR modulator, since each modulator will have to carry out one function only, i.e., trapping or targeting. Another advantage may be that it enables the trapping EMR source and targeting EMR source to emit EMR towards spatially separate EMR modulators, which in turn may enable the EMR light sources to be different, such as having different wavelengths. An advantage of having spatially separate EMR modulators may thus be, that the modulations carried out by targeting EMR modulator does not affect the trapping EMR and vice versa. This may in particular be advantageous if different wavelengths of EMR are used.

It is noted, that the response time of the system, based on a liquid crystal SLM with fast ferroelectric liquid crystal, is sub-millisecond. This enables spatially modifying, respectively, targeting EMR and trapping EMR within time intervals which are as short as 0.5 milliseconds. Thus, it may be possible to emit pulses of modulated targeting EMR and modulated trapping EMR within correspondingly short pulses. This short response time may also be utilized for time sharing of the targeting EMR, e.g., for employing several different wavelengths, such as multiple wavelengths each targeting a different part of a microscopic object.

It is also contemplated to use a specific wavelength of electromagnetic trapping or targeting EMR, such as 830 nm (which has the advantage that at this wavelength there may be less risk of damaging biological tissue), such as 488 nm, such as 633 nm (which corresponds to a typical HeNe laser), such as 532 nm, such as 1070 nm, such as 1064 nm (which corresponds to a typical ND:YAG laser), such as 532 nm, such as 1550 nm (which has the advantage that it is well suited for transmittance through optical fibers), such as 2 micron or higher.

According to another further embodiment of the invention, there is provided a system wherein the modulated trapping electromagnetic radiation and the modulated targeting electromagnetic radiation have different wavelengths, such as the wavelength of the modulated trapping electromagnetic radiation being 1064 nm and the wavelength of the modulated targeting electromagnetic radiation being 532 nm. An advantage of having different wavelengths may be that it enables choosing for each purpose, targeting and trapping, a wavelength which is particularly well suited, with no need to make a compromise in terms of choosing a wavelength which must be suitable for both but might not be the most suitable for each purpose. Another advantage of having different wavelengths may be, that it enables separating the modulated trapping EMR and the modulated targeting EMR in a relatively straightforward manner, e.g., by simply using a wavelength selective filter. This may, for example be advantageous in case a user prefers observing only photons originating from the modulated targeting EMR, because the user may then achieve this by simply using a filter which blocks EMR of wavelengths corresponding to the wavelength of the modulated trapping EMR, but which filter is transparent to wavelengths corresponding to wavelengths of the modulated targeting EMR. It is understood that the filter is then to be inserted in the optical path between the trapping volume and the observer (such as a detector or a camera).

According to an embodiment of the invention, there is provided a system wherein the trapping means is an optical trapping means emitting trapping EMR, such as modulated trapping EMR, and wherein the trapping EMR, such as the modulated trapping EMR, and the modulated targeting electromagnetic radiation have different wavelengths. According to an embodiment of the invention, there is provided a system wherein the trapping means is an optical trapping means emitting trapping EMR, and wherein the trapping EMR, such as the modulated trapping EMR, and the modulated targeting electromagnetic radiation have similar wavelengths.

According to another embodiment of the invention, there is provided a system wherein the primary spatial electromagnetic radiation modulator is arranged for applying, such as applies, a spatial modulation of the targeting EMR, such as the incident electromagnetic radiation, by changing its properties locally, such as an electrically or optically addressed spatial light modulator. A spatial light modulator typically operates according to the principles of light diffraction wherein each elementary unit (e.g., a pixel) of the modulator locally modulates the phase of a portion of a light beam impinging thereon, to provide a predetermined light profile. According to this particular embodiment, the modification of the EMR, such as light, does not involve moving an element of the spatial light modulator spatially. Rather a local property (such as transparency or optical path length) of the elementary unit is changed.

According to another embodiment of the invention, there is provided a system wherein the secondary spatial electromagnetic radiation modulator is arranged for applying, such as applies, a spatial modulation of the trapping EMR, such as the incident electromagnetic radiation, by changing its properties locally, such as an electrically or optically addressed spatial light modulator. According to this particular embodiment, the modification of the EMR, such as light, does not involve moving an element of the spatial light modulator spatially. Rather a local property (such as transparency or optical path length) of the elementary unit is changed.

According to another embodiment, there is provided a system, wherein the trapping means is enabling trapping at least two spatially different microscopic objects, where the spatially different microscopic objects may be positioned at spatially different planes with respect to an optical axis of the trapping means, such as the spatially different planes being orthogonal to the optical axis and displaced along the optical axis of the electromagnetic radiation targeting means. According to such embodiment, the trapped microscopic objects are not confined to lie in a particular plane. A possible advantage of this may be that it provides more freedom for trapping objects in the trapping volume, since no precautions in terms of placing the objects to be trapped in a specific plane are needed. In a particular embodiment, the trapping means comprises a GPC system, such as a GPC system with counterpropagating beams.

According to another embodiment of the invention, there is provided a system, wherein the position of at least one of the planes with respect to an optical axis of the trapping means may be changed, such as changed dynamically, such as changed during normal use, such as enabling manipulating microscopic objects along an optical axis of the trapping means. The optical axis of the trapping means is understood to be an axis parallel with a direction of propagation of the modulated trapping EMR, such as the trapping EMR in the trapping volume. A possible advantage of being able to move the plane may be that it enables trapping microscopic objects and moving them in a direction being parallel with a direction of propagation of the modulated trapping EMR. In a particular embodiment, the trapping means comprises a GPC system.

According to another embodiment of the invention, there is provided a system, wherein the electromagnetic radiation targeting means enabling targeting, such as focusing on, at least two spatially different microscopic objects, where the spatially different microscopic objects may be positioned at spatially different planes, such as focal planes, with respect to an optical axis of the electromagnetic radiation targeting means, such as the spatially different planes being orthogonal to the optical axis and displaced along the optical axis of the electromagnetic radiation targeting means. In particular embodiments, such three-dimensional targeting is realized using adjustable lenses. According to such embodiment, the targeted regions are not confined to lie in a particular plane. A possible advantage of this may be that it provides more freedom for targeting objects in the trapping volume, since no precautions in terms of placing the objects to be targeted in a specific plane are needed.

According to another embodiment of the invention, there is provided a system, wherein the position of at least one of the planes, such as focal planes, with respect to an optical axis of the electromagnetic radiation targeting means may be changed, such as changed dynamically, such as changed during normal use, such as enabling targeting microscopic objects along an optical axis of the electromagnetic targeting means. The optical axis of the electromagnetic radiation targeting is understood to be an axis parallel with a direction of propagation of the modulated targeting EMR, such as the targeting EMR in the trapping volume. A possible advantage of being able to move the plane may be that it enables following microscopic objects which move in a direction being parallel with a direction of propagation of the targeting EMR.

According to another embodiment of the invention, there is provided a system, wherein the position of at least one of the planes, such as one of the focal planes, with respect to an optical axis may be changed, such as changed dynamically, such as changed during normal use, so as to move from one side of a microscopic object being trapped by the trapping system to the other side of a microscopic object being trapped by the trapping system along an optical axis of the electromagnetic radiation targeting means. An advantage of this may be that it enables targeting microscopic objects on both sides of a targeted microscopic object.

According to another embodiment of the invention, there is provided a system further comprising sensing means arranged for determining the position, such as the position and orientation, of one or more microscopic objects, such as the position of the plurality of microscopic objects, such as the position and orientation of the plurality of microscopic objects within the trapping volume.

The sensing means serves for sensing information from the trapping volume. The 'sensing means' are capable of obtaining information regarding properties of objects or properties in the trapping volume. In exemplary examples the sensing means may be a camera for visually detecting a position or orientation of a micro device, a cantilever, such as an Atomic Force Microscopy (AFM) cantilever for detecting a force within the trapping volume, or an optical sensor for detecting emitted EMR, such as fluorescence, from within the trapping volume. Other types of sensing means are not excluded from the scope of the present invention. The sensing means may furthermore, in specific embodiments, be operably connected to a processor for analyzing the sensed information, such as a processor arranged to carry out image analysis.

According to another embodiment of the invention, there is provided a system further comprising a primary controlling means adapted for controlling the electromagnetic radiation targeting means. In a particular embodiment, the sensing means may be arranged for transmitting signals pertaining to the sensed information to the primary controlling means which may control the EMR targeting means based thereon. In a particular embodiment, the primary controlling means may be a processor, such as a computer comprising a processor. According to another embodiment of the invention, there is provided a system further comprising a secondary controlling means adapted for controlling the trapping means. In a particular embodiment, the sensing means may be arranged for transmitting signals pertaining to the sensed information to a secondary controlling means which may control the trapping means based thereon. In a particular embodiment, the secondary controlling means may be a processor, such as a computer comprising a processor. In another particular embodiment, the primary controlling means and the secondary controlling means are comprised within a single unit, such as a single processor.

According to another embodiment of the invention, there is provided a system wherein the system further comprises one or more micro devices, the one or more micro devices, such as a plurality of microdevices, being arranged for spatial manipulation by the trapping means, such as the trapping means enabling control over translational movement in three dimensions and rotational movement around at least two axes of the one or more micro devices, and being arranged for receiving the modulated targeting electromagnetic radiation and furthermore shaping, focusing, redirecting the modulated targeting electromagnetic radiation and/or changing the modulated targeting electromagnetic radiation from farfield to nearfield.

By having a system comprising one or more spatially controllable micro devices there is provided a system which facilitates manipulation and/or data gathering on the microscale in an efficient and simple manner. It may be seen as an advantage, that the one or more microdevices may be trapped and targeted independently, which may in turn enable a microdevice to be spatially manipulated and/or simultaneously targeted by modulated targeting EMR at any position, i.e., at a position being similar of different from the position where the modulated trapping EMR is incident. This may, for example, be beneficial when the targeting EMR of a primary wavelength is redirected (by the microdevice) onto an object to be examined (by EMR having the primary wavelength), while the modulated trapping EMR of a different secondary wavelength is used for spatially controlling the microdevice.

In a particular embodiment, the microdevice is a microdevice for emitting electromagnetic radiation, the microdevice comprising a first electromagnetic radiation emitting unit arranged to emit electromagnetic radiation, means for enabling simultaneous non-contact spatial control over the microdevice in terms of:
translational movement in three dimensions, and
rotational movement around at least two axes, wherein the means for enabling non-contact spatial control over the microdevice are arranged for being spatially controlled by forces applied by electromagnetic radiation, such as modulated trapping EMR, and wherein the first electromagnetic radiation emitting unit and the means for enabling spatial control over the microdevice are structurally linked, and wherein, the first electromagnetic radiation emitting unit comprising:
an electromagnetic radiation in-coupling element arranged to receive incoming electromagnetic radiation, such as a plurality of electromagnetic radiation in-coupling elements, an electromagnetic radiation out-coupling element being structurally linked to the electromagnetic radiation in-coupling element and the electromagnetic radiation out-coupling element being arranged to emit electromagnetic radiation in response to said incoming electromagnetic radiation, such as a plurality of electromagnetic radiation out-coupling elements, and wherein, wherein the electromagnetic radiation in-coupling element is arranged to receive incoming electromagnetic radiation having a first direction and the electromagnetic radiation out-coupling element is arranged to emit electromagnetic radiation having a second direction where the first direction and the second direction are non-parallel, such as an angle between the first and second direction is at least 10 degrees, such as at least 20 degrees, such as at least 45 degrees, or wherein the electromagnetic radiation in-coupling element is arranged to receive incoming electromagnetic radiation having a first direction and the electromagnetic radiation out-coupling element is arranged to emit electromagnetic radiation having a second direction where the electromagnetic radiation out-coupling element is spatially displaced with respect to the electromagnetic radiation in-coupling element along a direction being orthogonal to the first direction, and where the first direction and the second direction are parallel.

According to another embodiment of the invention, there is provided a system wherein the system further comprises one or more micro devices, wherein the one or more micro devices are each arranged for holding a microscopic optical element, such as a spherical bead. The micro devices may each have a holding means, such as a ring shaped element, wherein another microscopic element, such as a spherical bead, may be placed and held and manipulated. An advantage of having such micro device may be that it enables spatial control over readily available microscopic element, such as spherical beads, which may be useful as microscopic lenses being operated spatially at the microscale, and possibly within micrometers from an object under examination.

According to another embodiment of the invention, there is provided a system wherein the system further comprises
an electromagnetic radiation detector arranged for receiving electromagnetic radiation emitted from within the trapping volume, such as emitted from a plurality of microscopic objects, such as emitted from within the trapping volume and traversing the primary electromagnetic radiation modulator.

By adding an electromagnetic radiation detector as described, it might be possible to carry out optical analysis of microscopic structures in an effective manner.

According to a second aspect, the invention further relates to a method for independently holding and/or manipulating one or more microscopic objects and for targeting at least a part of the one or more microscopic objects within a trapping volume with electromagnetic radiation, the method comprising trapping the one or more microscopic objects within the trapping volume by using a trapping means, receiving and spatially shaping targeting electromagnetic radiation so as to generate modulated targeting electromagnetic radiation directed towards at least a part of the one or more microscopic objects so as to specifically target at least a part of the one or more microscopic objects within the trapping volume by using an electromagnetic radiation targeting means, wherein the trapping means and the electromagnetic radiation targeting means are enabled to function independently of each other, and wherein the electromagnetic radiation targeting means enables independently targeting at least two spatially different microscopic objects, and wherein the trapping means and the electromagnetic radiation targeting means are spatially separated. This aspect of the invention is particularly, but not exclusively, advantageous in that the method according to the present invention may be implemented by the system according to the first aspect.

According to a second aspect, the invention further relates to a use of a system according to the first aspect for independently holding and manipulating one or more microscopic objects, such as a plurality of microscopic objects and for targeting at least a part of the one or more microscopic objects within a trapping volume with electromagnetic radiation.

The first, second and third aspect of the present invention may each be combined with any of the other aspects. These and other aspects of the invention will be apparent from and elucidated with reference to the embodiments described hereinafter.

BRIEF DESCRIPTION OF THE FIGURES

The system method, and use according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
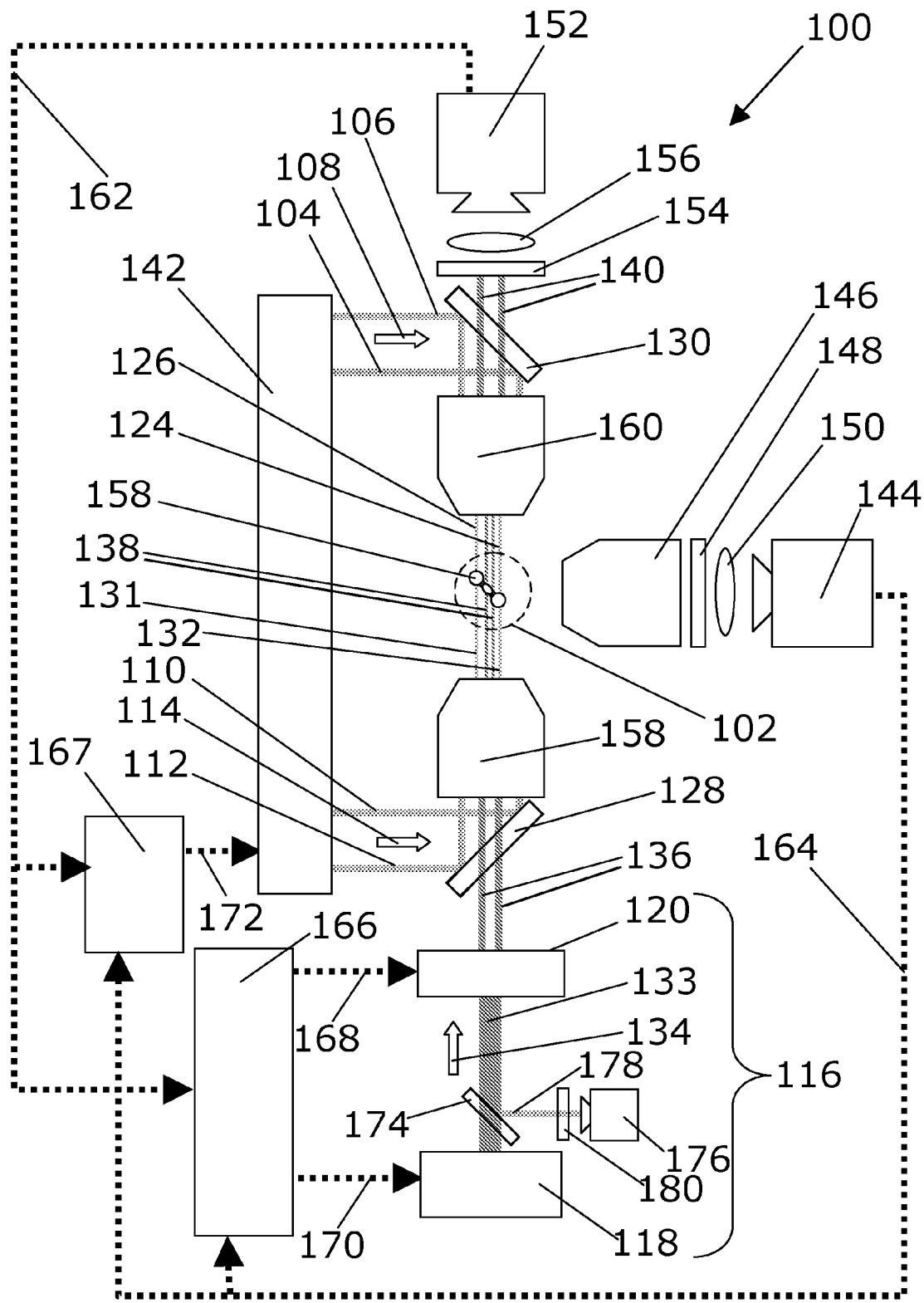
FIG. 1 shows a system for independently holding and manipulating a plurality of microscopic objects and for optically targeting at least a part of the plurality of microscopic objects within a trapping volume.

FIG. 1 shows a system (100) for independently holding and manipulating a plurality of microscopic objects (158) and for targeting at least a part of the plurality of microscopic objects within a trapping volume (102) with electromagnetic radiation (138), the system comprising trapping means (142, 128, 130, 158, 160) for holding and manipulating the plurality of microscopic objects within the trapping volume,
electromagnetic radiation targeting means (116), the electromagnetic radiation targeting means comprising
a targeting electromagnetic radiation source (118) for emitting targeting electromagnetic radiation (132),
a primary spatial electromagnetic radiation modulator (120) for receiving and spatially shaping the targeting electromagnetic radiation so as to generate modulated targeting electromagnetic radiation (136) directed towards at least a part of the plurality of microscopic objects so as to enable specifically targeting at least a part of the plurality of microscopic objects within the trapping volume, wherein the trapping means and the electromagnetic radiation targeting means (116) are enabled to function independently of each other, and wherein the electromagnetic radiation targeting means enables independently targeting at least two spatially different microscopic objects, and wherein the trapping means and the electromagnetic radiation targeting means are spatially separated In more detail, the specific trapping means of FIG. 1 is an optical trapping means and is embodied by a light source 142 which emits one or more lower light beams 110, 112 having a lower direction 114 towards a lower dichroic mirror 128 which reflects the lower light beams 110, 112 into a lower microscope objective 158 so as to direct the now re-shaped lower light beams 130, 132 into the trapping volume 102. The specific trapping means of FIG. 1 utilizes counter propagating beams for trapping, so the light source 142 furthermore emits one or more upper light beams 104, 106 having an upper direction 108 towards an upper dichroic mirror 130 which reflects the upper light beams 104, 106 into an upper microscope objective 160 so as to direct the now re-shaped upper light beams 124, 126 into the trapping volume 102. The trapping volume may hold one or more microscopic devices 158, which will be described in greater detail elsewhere in this application. The light source 142 may be a LASER source emitting at 1064 nm. It is understood that the trapping means may comprise one or more secondary spatial EMR modulators (not shown) which receives EMR from an EMR source and generates modified EMR arranged for optical trapping of a plurality of microscopic objects.

In a particular embodiment, the trapping means may be embodied by the so-called BioPhotonics Workstation. The BioPhotonics workstation is described in the reference "Independent trapping, manipulation and characterization by an all-optical biophotonics workstation", by H. U. Ulriksen et al., J. Europ. Opt. Soc. Rap. Public. 3, 08034 (2008) which is hereby incorporated in entirety by reference. The BioPhotonics Workstation uses near-infrared light ($\lambda$=1064 nm) from a fibre laser (IPG). Real-time spatial addressing of the expanded laser source in the beam modulation module produces reconfigurable intensity patterns. Optical mapping two independently addressable regions in a computer-controlled spatial light modulator as counter propagating beams in the sample volume enables trapping a plurality of micro-objects (currently generates up to 100 optical traps). The beams are relayed through opposite microscope objectives (Olympus LMPLN 50×IR, WD=6.0 mm, NA=0.55) into a 4.2 mm thick Hellma cell (250 µm×250 µm inner cross section). A user traps and steers the desired object(s) in three dimensions through a computer interface where the operator can select, trap, move and reorient cells and fabricated micro devices with a mouse or joystick in real-time. Videos of the experiments are grabbed simultaneously from the top-view and side-view microscopes.

The particular setup depicted in FIG. 1 furthermore comprises a top camera 152 which may be useful for imaging via the upper microscope objective 160, the upper filter 154 and the upper lens 156 the trapping volume 102 from the top. Similarly, the setup comprises a side camera 144 which may be useful for imaging via the side microscope objective 146, the side filter 148 and the side lens 150 the trapping volume 102 from the side.

The specific electromagnetic radiation targeting means 116 comprises a targeting electromagnetic radiation source 118 and a primary spatial electromagnetic radiation modulator 120. The targeting electromagnetic radiation source 118 may for example be a LASER source emitting at 532 nm, for emitting targeting electromagnetic radiation 132 in a direction 134 towards the primary spatial electromagnetic radiation modulator 120. The primary spatial electromagnetic radiation modulator 120 is arranged for receiving and spatially shaping the targeting electromagnetic radiation so as to generate modulated targeting electromagnetic radiation 136 directed towards at least a part of the plurality of microscopic objects. In the particular example of FIG. 1 the modulated targeting electromagnetic radiation 136, which comprises two beams of EMR in the figure, passes through the lower dichroic mirror 128 and is shaped by the lower microscope objective 158 before entering into the trapping volume as indicated in the figure by the two light beams 138 where it can target a region on the plurality of microscopic objects 158. The modulated targeting electromagnetic radiation 136 may also pass through the plurality of microscopic objects, the lower microscope objective 160, the lower dichroic mirror 130, as indicated by the two light beams 140, before being blocked by the upper filter 154 so as not to enter into the top camera 152 through the upper lens 156. Any one of the upper camera 152 and the side camera 144 may be a CCD camera, and may be connected to a processor such as to enable visualizing or storing the obtained images, and/or for utilizing the images for guiding the trapping means and/or the electromagnetic radiation targeting means.

Furthermore, FIG. 1 shows primary controlling means 166 and secondary controlling means 167, such as each of the controlling means being a processor arranged for receiving information from sensing means, such as receiving upper view information 162 from the upper camera 152 and/or side view information 164 from side camera 144. The primary controlling means 166 being arranged for sending, respectively targeting controlling information 168, 170 to the primary spatial EMR modulator 120 and the targeting EMR source 118. The secondary controlling means so as to control the EMR targeting means 116 based on the information from the sensing means. The primary controlling means 167 being arranged for sending trapping controlling information 172 to the trapping means for controlling the trapping means. The primary and secondary controlling means 166, 167 may be combined, e.g., into a single processing unit.

Furthermore, FIG. 1 shows a dichroic mirror 174 arranged so as to allow passage of the targeting electromagnetic radiation while reflecting EMR which travels along substantially the same path, but in a direction opposite the direction indicated by arrow 134, such as being emitted from within the trapping volume, such as emitted from the microscopic object 158, the thus reflected EMR 178 being captured by a detector 176 such as a CCD camera. It is also contemplated to adapt the system with appropriate filters, such as a filter 180 between dichroic mirror 174 and detector 176, or similar means so as to enable performing fluorescence spectroscopy on the microscopic object with incident EMR from the targeting EMR source 118 and the emitted EMR 178 being captured by detector 176.

According to some embodiments of the present invention, there is provided an electromagnetic radiation targeting means which comprises a targeting electromagnetic radiation source and a primary spatial electromagnetic radiation modulator and furthermore optics configured for directing the modulated targeting electromagnetic radiation to one or more target locations within the trapping volume.

The light may in such embodiments be directed by means of optics which may include free-space optics (e.g., an arrangement of lenses, microlens arrays, diffractive elements, etc.) and/or guiding optics (e.g., waveguides, optical fibers, fiber bundles, gradient-index (GRIN) fiber lenses, lens-relay endoscopes, etc.) and/or a generalized phase contrast filter (for transforming phase modulations into intensity modulations).

Guiding optics are particularly useful when the target location is not optically accessible by direct illumination.

According to some embodiments of the invention the primary spatial electromagnetic radiation modulator comprises a liquid crystal, such as a liquid crystal device.

In various exemplary embodiments of the invention the wavelengths and intensities of the modulated targeting EMR are selected so as to generate sufficient heat to such that a temperature at a spot within the trapping volume is increased by T_inc, where T_inc may be from about 1° C. to about 10° C., or from about 2° C. to about 7° C., or from about 3° C. to about 6° C., e.g., about 5° C.

The system 100 comprises an EMR targeting means 116 which generates a spatially modulated light beam encoded with a stimulation pattern. EMR targeting means 116 can comprise one or more light sources 118 which generate targeting EMR 132, and a primary spatial EMR modulator 120, which is a spatial light modulator (SLM), which performs the modulation. The EMR targeting means is shown as having only one light source 118, this need not necessarily be the case, since the EMR targeting means can have any number of light sources, depending, for example, on the number of different specific wavelength bands which are required to target the microscopic objects. Additional light sources may be added, as is known in the art, e.g., by using one or more dichroic mirrors.

The EMR targeting means 116 may comprise both the primary spatial EMR modulator 120 and a primary controlling means 166.

The controlling means 166 may receive information from external sources, e.g., sensing means 144,152, and may in response determine a modulation pattern which is formed on the primary EMR modulator 120. The primary spatial EMR modulator 120 receives and modulates targeting EMR 132 in accordance with the modulation pattern. Thus, the primary spatial EMR modulator 120 modulates targeting EMR 132 in accordance with the targeting controlling information 168 to provide modulated targeting EMR 136 constituting a reconstructed targeting pattern for specifically targeting at least a part of the plurality of microscopic objects 158. The spatial variations of optical characteristic across the primary spatial EMR modulator 120 may in specific embodiments be known as a hologram. In specific embodiments, the Fourier holography or Fresnel holography may be employed, such as by using a primary spatial EMR modulator which may be an SLM arranged for modulating the phase profile, such as the primary spatial EMR modulator being a phase-only SLM.

The primary controlling means can include a data processor which calculates the pattern and transmits it to the primary spatial EMR modulator 120 either as electrical signals or as optical signals.

Primary spatial EMR modulator 120 can comprise a nematic liquid crystal, or a ferroelectric liquid crystal (FLC), the latter being preferred from the standpoint of high response speed.

Primary spatial EMR modulator 120 can also comprise an array of mirrors or micromirrors capable of moving over a full wavelength allowing 2 pi of phase control.

Targeting EMR 132 from the light source(s) can be directed to primary spatial EMR modulator 120 of the electromagnetic radiation targeting means 116 via one or more optical redirecting and focusing elements. In the representative example illustrated in FIG. 1, the light beam from the targeting EMR source is directly incident on the primary spatial EMR modulator, but could in other embodiments also be, e.g, redirected by one or more mirrors and passes through one or more filters or dichroic mirrors.

Figure 2:
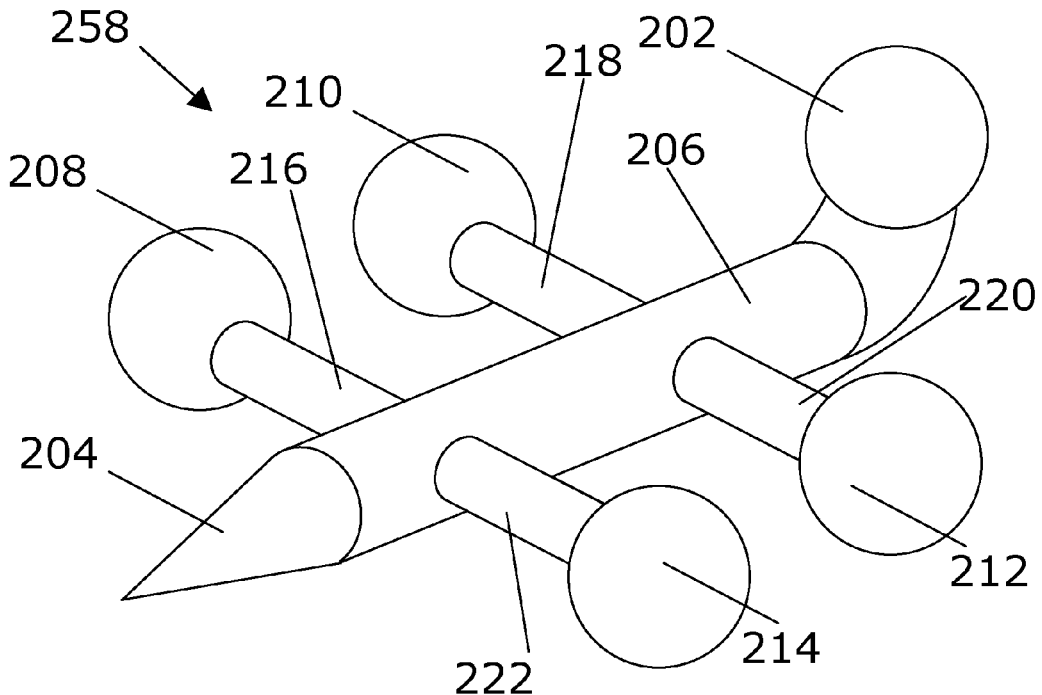
FIG. 2 shows a perspective view of an exemplary microscopic object.

FIG. 2 shows a perspective view of an exemplary microscopic object 258, the microscopic object 258 features a light in-coupling element 202, a light out-coupling element 204. The light in-coupling element 102 is arranged to receive light and guide the received light into a light guiding element 206 which optically connects the light in-coupling element with the light out-coupling element. Thus, light may be received at light guiding element 202 and guided by light guiding element 206 to the light out-coupling element 204 where it is emitted. The optical elements 202, 204, 206 thus form an EMR emitting unit which enables emission of EMR, such as light. The micro device further comprises means for enabling non-contact spatial control over the micro device, the means being embodied by optical handles 208, 210, 212, 214. The handles may be substantially spherical elements which may enable an optical trapping system to trap each of the handles so as to enable manipulating the micro device, such as manipulating with 6 degrees of freedom, i.e, in all three geometric dimensions, and rotation around all three geometric axes. Each of the optical handles is structurally linked to the light guiding element 206 via linking structures 216, 218, 220, 222. In the present embodiment, the light out-coupling element 204 is shaped conically, an advantage of such shape may be that the micro device thus has a sharp tip which may be used to physically contact and manipulate other objects, such as a biological cell. Another advantage may be that the light out-coupling element may serve as an output element for shaping the EMR emitted from the first EMR emitting unit.

Figure 3:
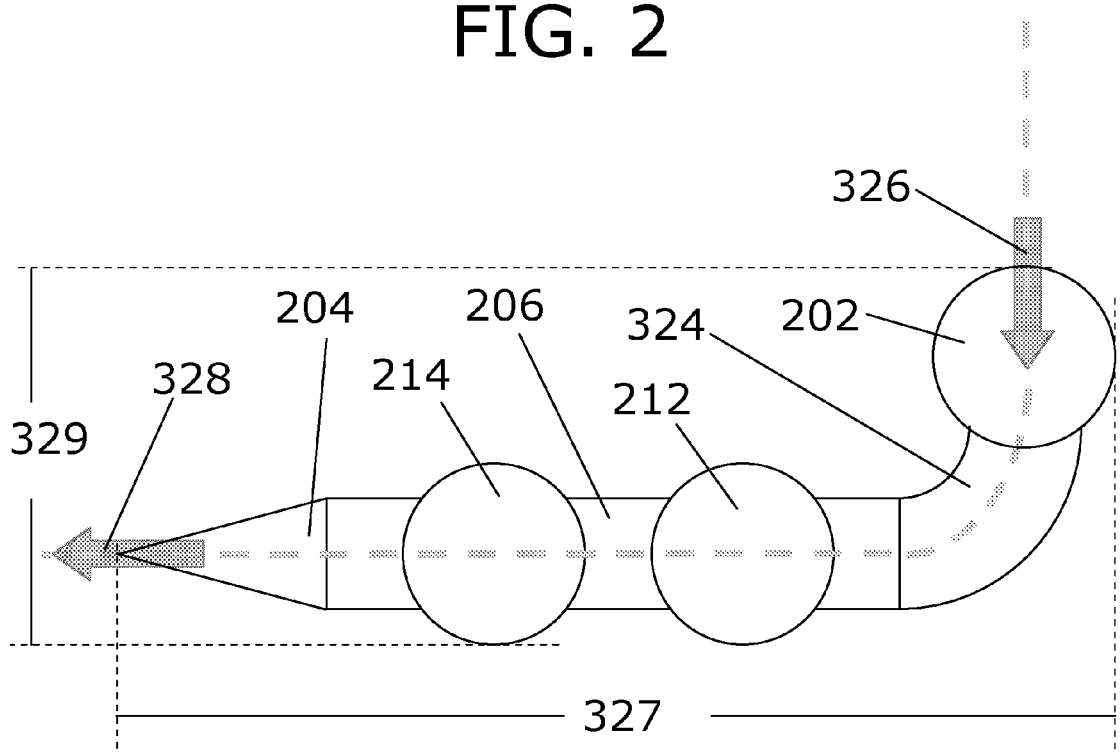
FIG. 3 shows a side view of the microscopic object.

FIG. 3 shows a side view of the microscopic object 258 depicted in FIG. 2. In FIG. 3 a bend part 324 of the light guiding element 206 is more clearly seen. The bend part 324 of the light guiding element enables incoming targeting light 326 to be received by the light in-coupling element 202 and to be guided through the light guiding element 206 and through the light out-coupling part 204 as emitted light 328. The skilled person will readily realize that the optical path is bi-directional, and light may consequently also be collected at the light out-coupling element 204, be guided through the light guiding element 206 and emitted from the light in-coupling element 202. FIG. 3 also indicates a length 327 and a height 329 of the micro device. In an exemplary embodiment the length 327 is 35 micrometer and the height 329 is 20 micrometer, but other dimensions in the micrometer region, such as within 1 micrometer to 1 millimeter are conceivable.

Figure 4:
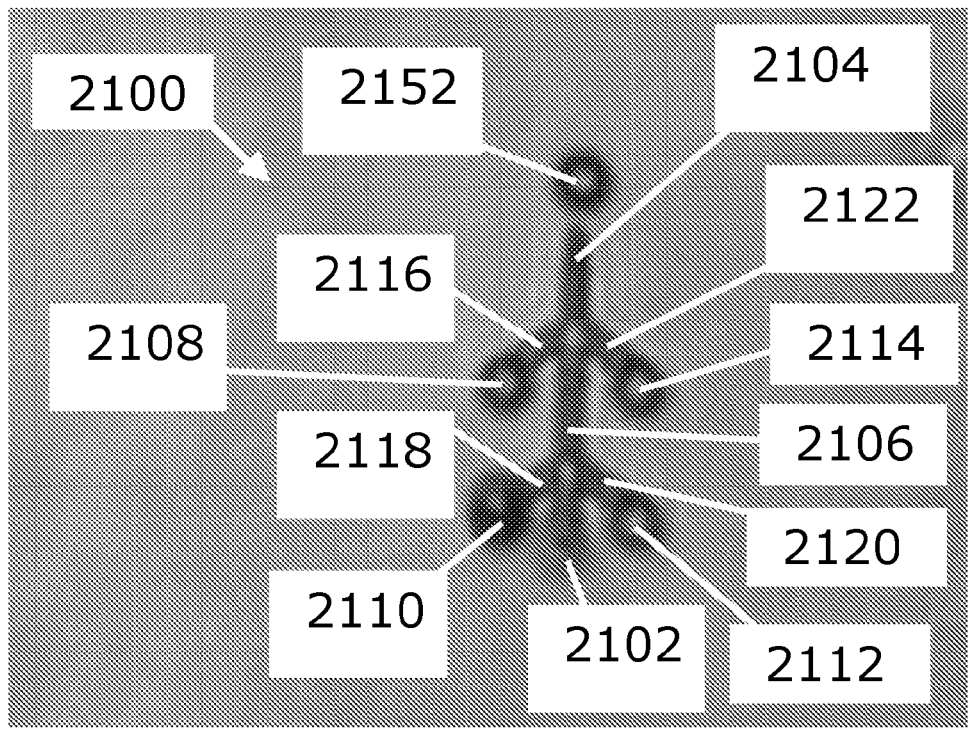
FIGS. 4-5 show experimental data in the form of images of an embodiment of the micro device.
Figure 5:
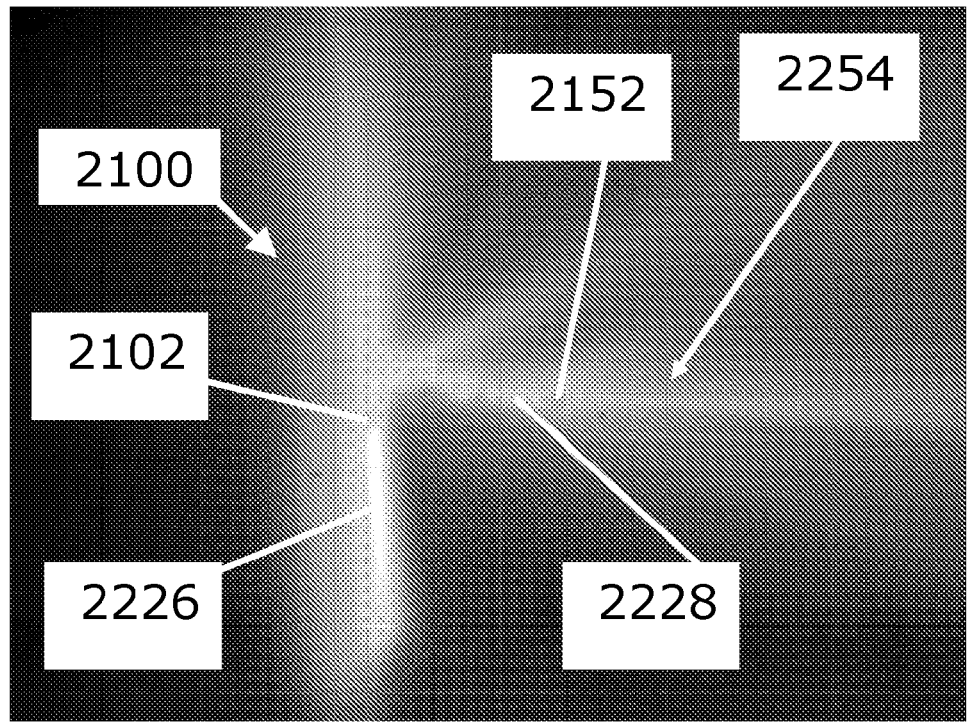

FIGS. 4-5 show experimental data in the form of images of an embodiment of the micro device.

FIG. 4 shows a micro device 2100 which is similar to the embodiment shown in FIGS. 2-3 (notice that the micro device in FIG. 3 is seen from the side and points to the left while the micro device in FIG. 4 is seen from the bottom and points upwards). The micro device in FIG. 4 is shown in a bottom view, i.e., the light guiding element 2106, the linking structures 2116, 2118, 2120, 2122, the optical handles 2108, 2110, 2112, 2114, and the light out-coupling element 2104 are all in the plane of the paper, which is hereafter referred to as the plane of the micro device, while the light in-coupling 2102 element is on the other side of the plane of the micro device with respect to the observer. In the plane of the micro device is also seen a spherical bead 2152, which is optically trapped, just in front (i.e., 'above'—in the picture) of the micro device. The spherical bead 2152 may act as an output element for shaping the EMR emitted from the first EMR emitting unit. Notice that the linking structures 2116, 2118, 2120, 2122 are slightly rotated (approximately 40 degrees) around an axis orthogonal to the paper so as not to be orthogonal with respect to the guiding element 2106. An advantage of this rotation is that there is provided a backward bending of the linking structures serving to avoid the light guided via guiding element 2106 to be guided into the linking structure.

FIG. 5 shows the micro device 2100 of FIG. 4, however, it is noticed that the micro device is reoriented with respect to the view in FIG. 4. In FIG. 5 the micro device is shown in a side view, corresponding to the view in FIG. 3, except that the micro device is rotated 180 degrees around an axis orthogonal to the plane of the paper. FIG. 5 furthermore features the spherical bead 2152, incoming targeting light 2226 and emitted light 2228. FIG. 5 shows that the emitted light 2228 is shaped by the optically trapped spherical bead 2152, and it can be seen that the light is focused at a point 2254 in front of (i.e., to the right of) the micro device.

Figure 6:
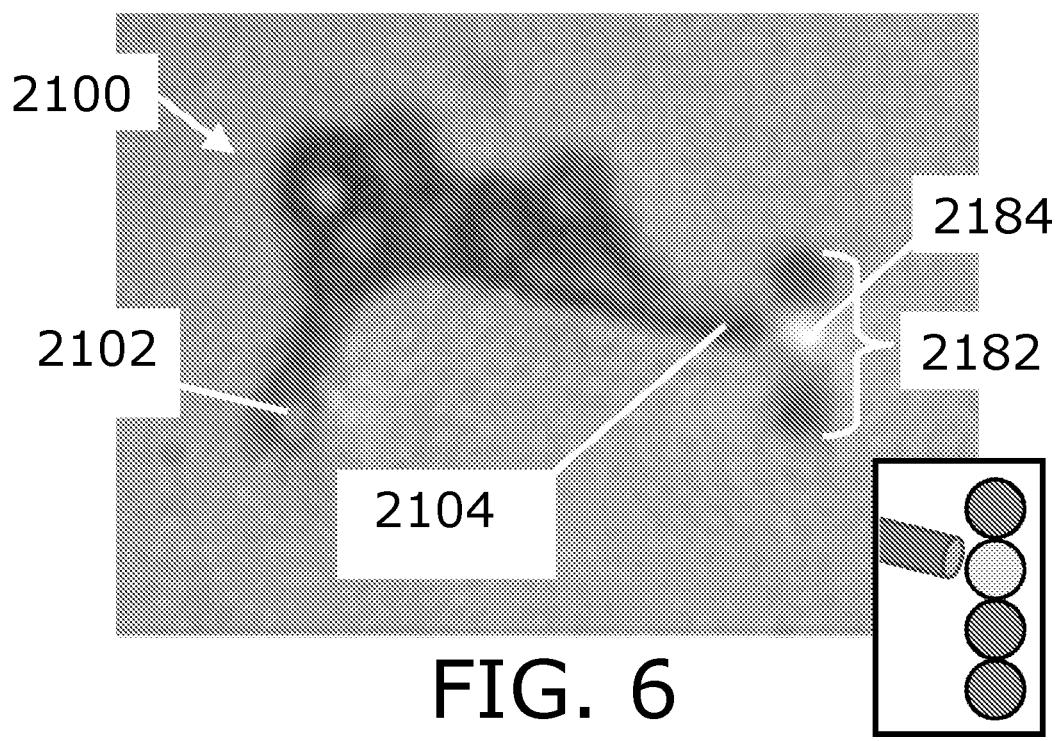
FIGS. 6-8 show light coupling and optical manipulation experiments.
Figure 7:
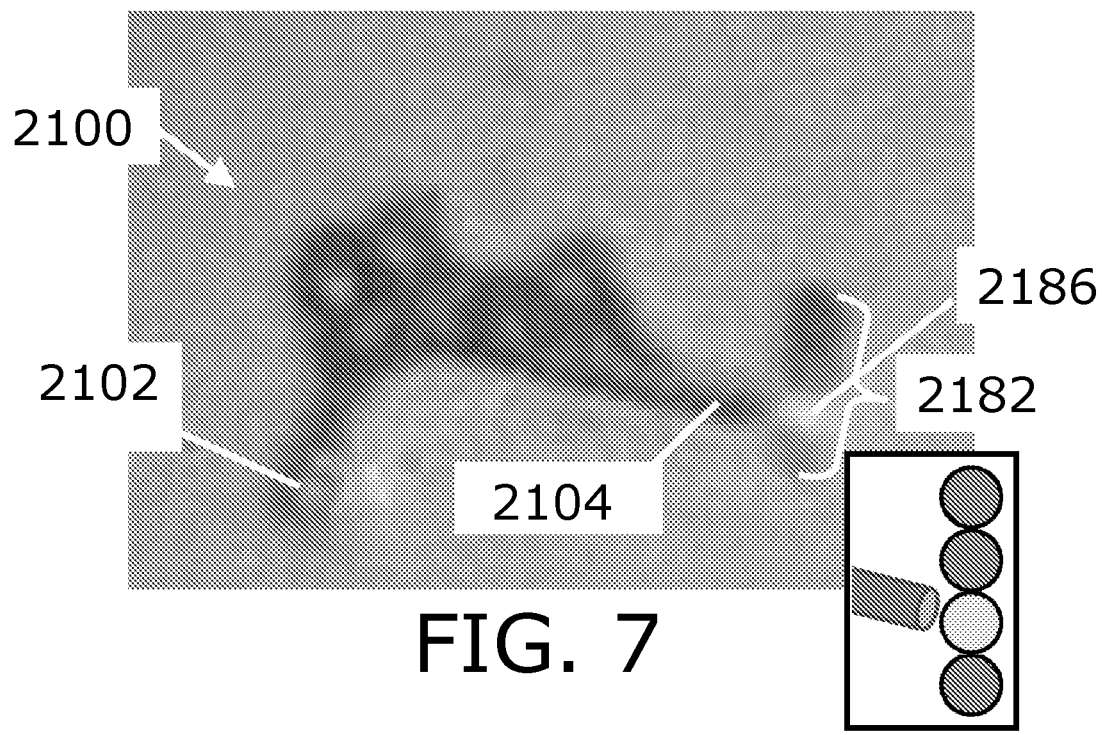

FIGS. 6-8 show light coupling and optical manipulation experiments.

FIGS. 6-7 are snapshots showing selective fluorescence excitation of a selected bead from a group of beads 2182, where the group of beads is a vertical column of 4 beads placed in a row being adjacent to each other. The selective fluorescence excitation is carried out using a micro device similar to the micro device schematically illustrated in FIGS. 2-3 and imaged in FIGS. 4-5.

FIG. 6 shows that selective illumination of the second bead 2184 from the top of the group of beads 2182, where the selective illumination is made with light coupled in through the light in-coupling element 2102 of the micro device 2100 and emitted via the light out-coupling element 2104. The inset schematically illustrates that only the second bead from the top is excited.

FIG. 7 correspondingly shows selective illumination of the third bead 2186 from the top of the group of beads 2182. The inset schematically illustrates that only the third bead from the top is excited.

Figure 8A:
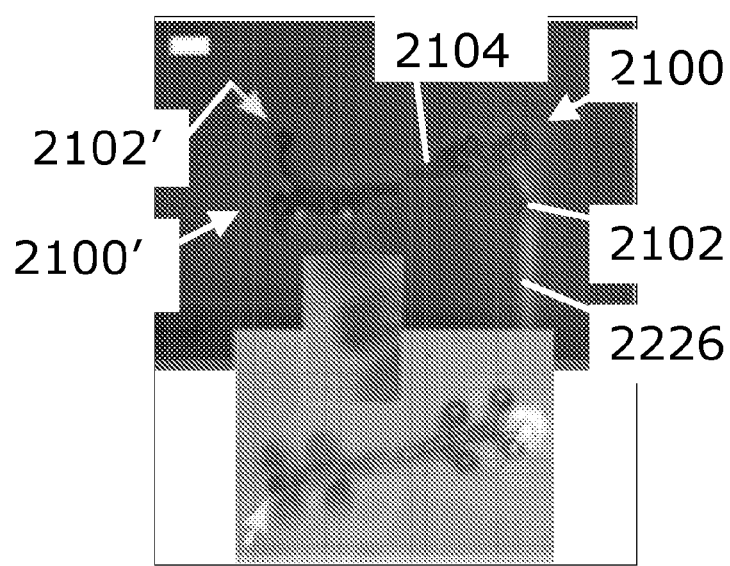
Figure 8B:
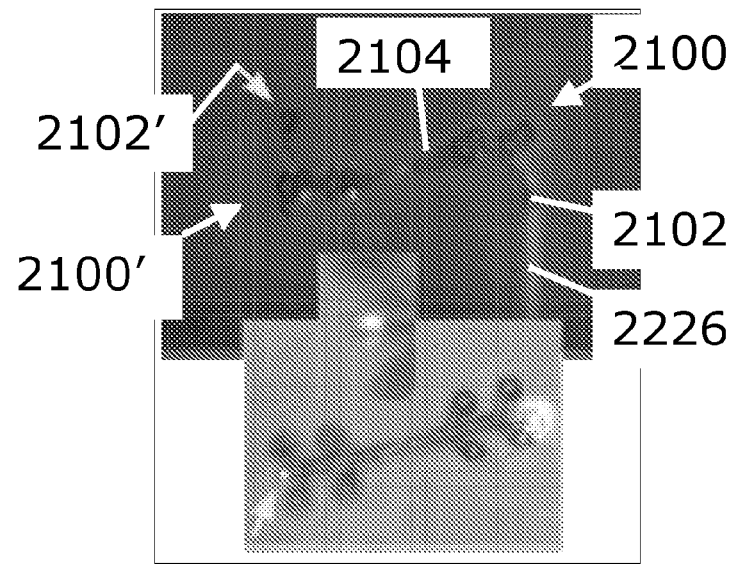
Figure 8C:
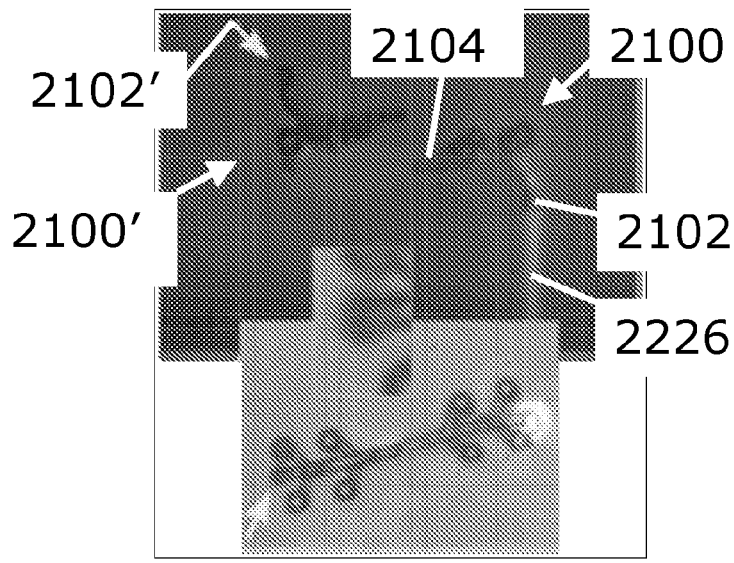

FIGS. 8A-C show experimental snapshots using reversed light coupling: An optically trapped micro device 2100 creates a localized field in front of the light out-coupling element 2104 by means of incoming targeting light 2226 which is coupled into the micro device via light in-coupling element 2102 and a second trapped micro device 2101' (which is similar micro device 2100 except for a 180 degrees rotation around an axis orthogonal to the plane of the paper) which is manipulated, which in the present case means moved upwards, so as to scan the local field; the reverse-coupled light is visible from a top microscope, as is evident from the lower insets in each of FIGS. 8A-C and in particular the lower inset of FIG. 8B where a bright dot can be observed (as indicated by the arrow in the lower insert of FIG. 8B, which is enlarged in the middle inset). The bright dot corresponds to light which is emitted from the light out-coupling element 2104 of micro device 2100 and collected by a corresponding element on micro device 2100' and subsequently emitted from the light in-coupling element 2102' which in this case is emitting light. The scalebar is 10 micron. The middle inset in each of FIGS. 8A-C shows a close-up of the light in-coupling element 2102' (which here function as an element for light out-coupling) also shown in the lower inset.

Figure 9:
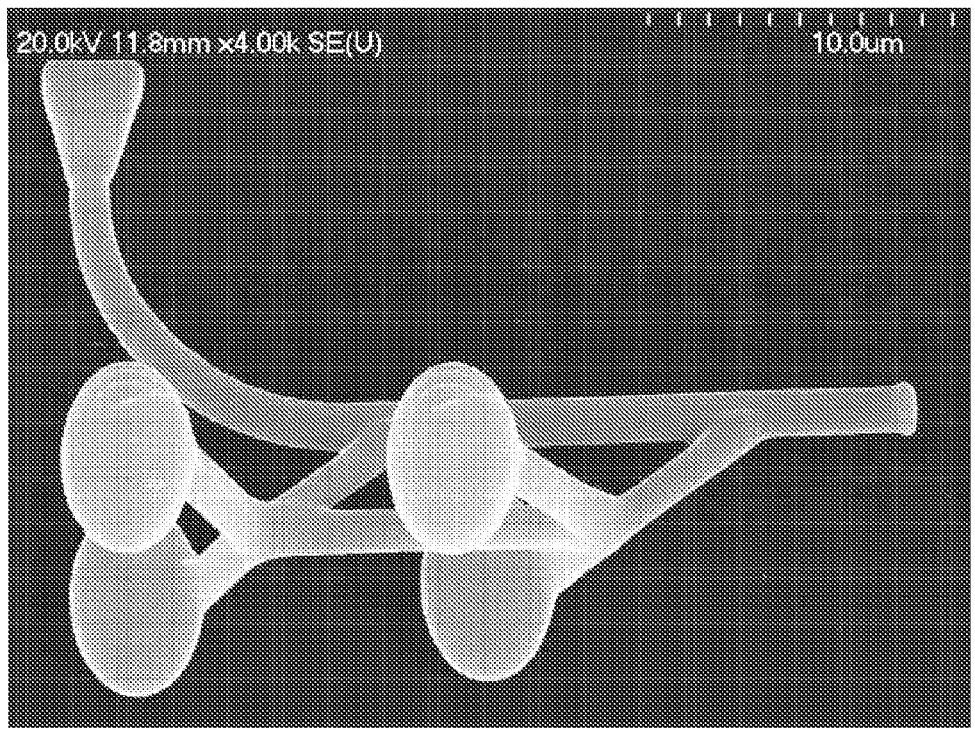
FIG. 9 shows a SEM image of a representative two-photon polymerized structure.

FIG. 9 shows a SEM image of a representative two-photon polymerized structure being a bent waveguide (bending radius R being approximately 8 micron; width being approximately 1.5 micron) sitting atop a supporting structure having spheroidal handles for optical trapping; the waveguide is connected via reverse-angled rods for minimal light-coupling loss via the support structure.

Figure 10:
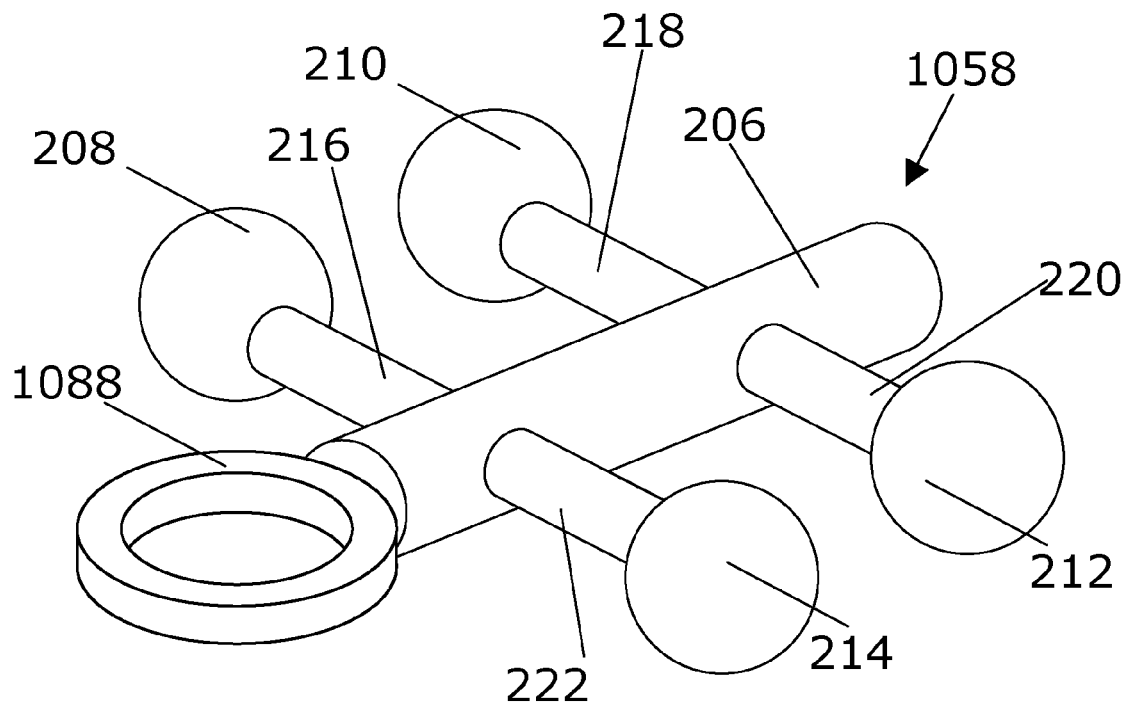
FIG. 10 shows another type of micro device.

FIG. 10 shows another type of micro device 1058 similar to the micro devices depicted in FIGS. 2-3, except that the light in-coupling element 202 and the bend part 324 of the light guiding element is not present in the micro device of FIG. 10. Furthermore, a light out-coupling element 204 has been replaced with a holding means 1088 which in the present embodiment is a ring-shaped element. The advantage of having a holding means may be that it enables holding and manipulating other objects, such as spherical beads which may be applicable for use as optical elements. For example, a spherical bead which may be provided at a relatively low cost or effort, may in this way be collected and uses as an lens which can be brought relatively close to an object under examination.

Figure 11:
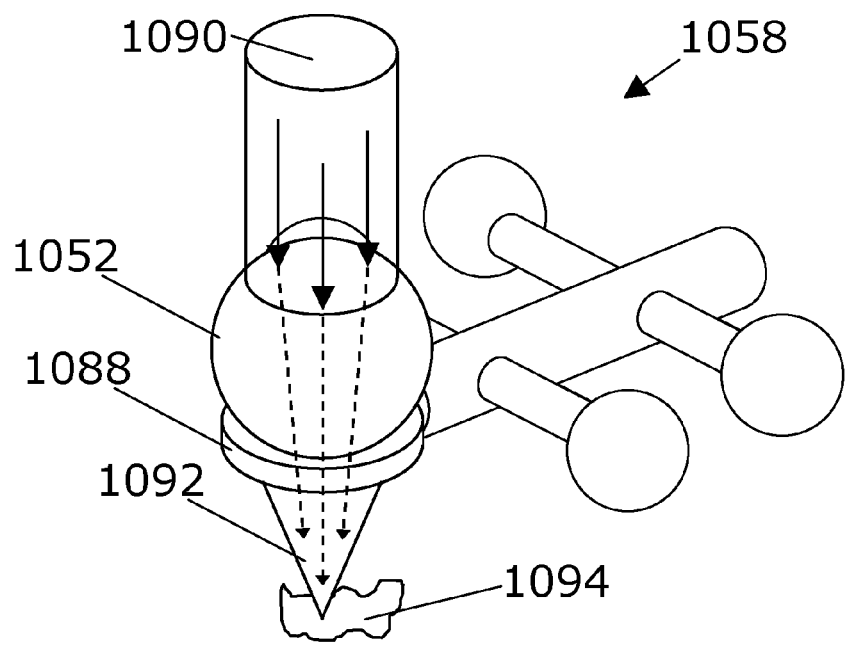
FIG. 11 is an illustration of the micro device with a spherical bead.

FIG. 11 is an illustration of the micro device 1058 of FIG. 10 which is here shown with a spherical bead 1052 in the holding means 1088. Incoming light 1090 is collected by the spherical bead, which now works as a lens element, and emitted light 1092 is focused on an object 1094 under examination.

Figure 12:
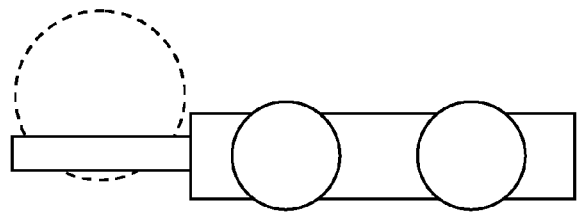
FIG. 12 is a side view of micro device.

FIG. 12 is a side view of micro device 1058.

Figure 13:
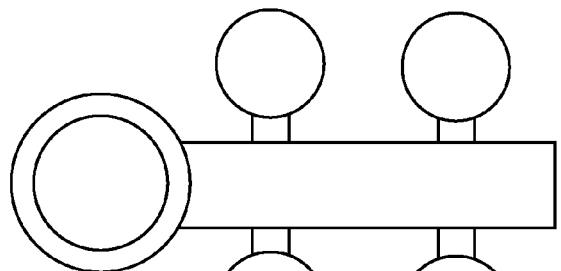
FIG. 13 is a top view of micro device.

FIG. 13 is a top view of micro device 1058.

Figure 14:
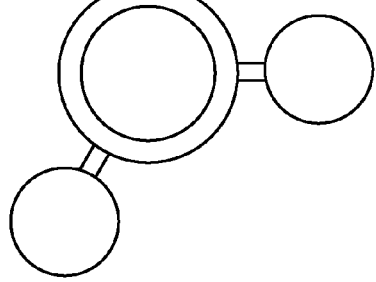
FIG. 14 is a top view of an alternative embodiment of a micro device.

FIG. 14 is a top view of an alternative embodiment of a micro device with holding means.

The basic idea proposed in FIGS. 10-14, is that optically manipulated micro devices, such as micro devices 1058, are designed with a holding means 1088, such as a mechanical tip-shape so that they can "pick up" and hold spherical objects which may function as ball lenses of different sizes (e.g. glass or polymer beads of different sizes) and act as 6 degrees of freedom (DOF) manipulated magnifying glasses on the sub-micron-scale. The ball lenses (beads) can simply be catapulted by beams and then each appropriate tool will be optically positioned to grip a bead when it slowly falls down similar to an oversize basketball landing in the basket net in slow motion. The ball lenses can be used bi-directionally to both focus independent light and capture and relay radiated light from a specimen.

A further generalization of the basic idea involves combining with micro devices with light couplers (such as light in-coupling element 202 of the embodiments depicted in FIGS. 2-3) so the reconfigurable ball lenses can be used from both top and side simultaneously. There is a host of variations on this basic concept.

Figure 15:
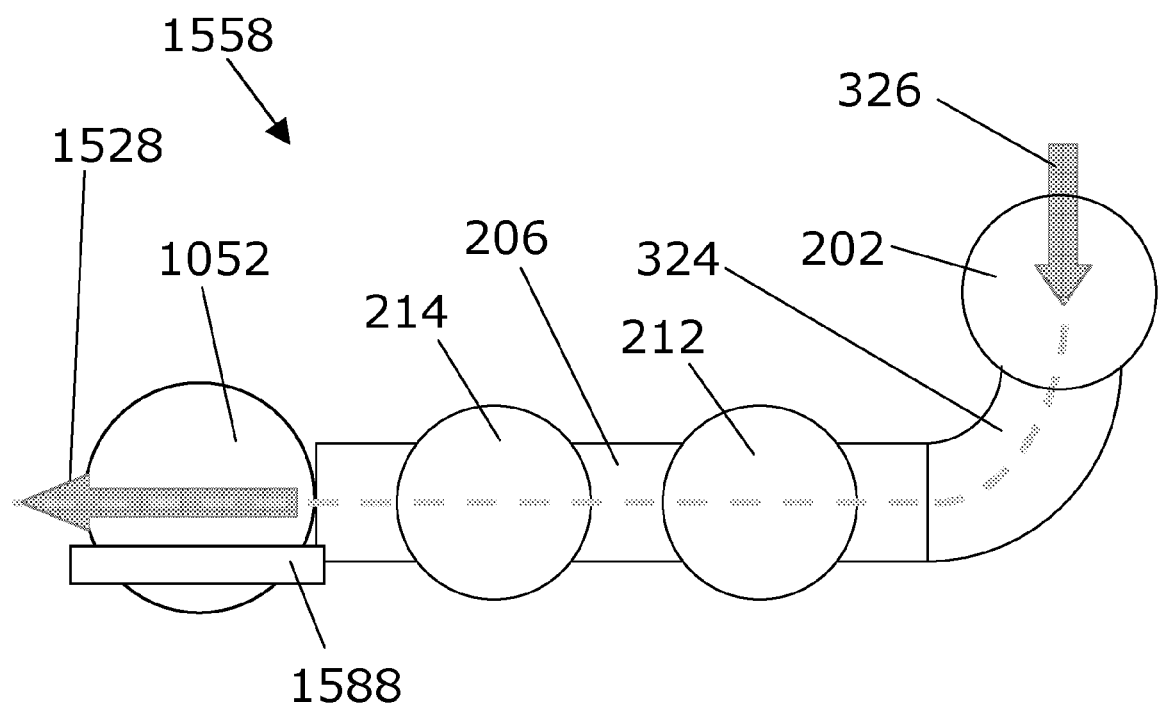
FIG. 15 shows a side view of another type of micro device.

FIG. 15 shows a side view of another type of micro device 1558 similar to the micro devices depicted in FIGS. 10-14, except that the light in-coupling element 202 and the bend part 324 of the light guiding element is present in the micro device of FIG. 15. With the embodiment of FIG. 15, incoming light targeting 326 is guided through the micro device 1558 and collected by the spherical bead 1588, which now works as a lens element, and emitted light 1528 may be focused on any nearby object.

In a general embodiment, there is provided a system for independently holding and manipulating a plurality of microscopic objects and for targeting at least a part of the plurality of microscopic objects within a trapping volume with electromagnetic radiation, the system comprising
  trapping means for holding and manipulating the plurality of microscopic objects within the trapping volume,
  electromagnetic radiation targeting means, the electromagnetic radiation targeting means comprising
    a targeting electromagnetic radiation source for emitting targeting electromagnetic radiation,
    a primary spatial electromagnetic radiation modulator for receiving and spatially shaping the targeting electromagnetic radiation so as to generate modulated targeting electromagnetic radiation directed towards at least a part of the plurality of microscopic objects so as to enable specifically targeting at least a part of the plurality of microscopic objects within the trapping volume,
wherein the trapping means and the electromagnetic radiation targeting means are enabled to function independently of each other. In a more particular embodiment, the trapping means and the electromagnetic radiation targeting means are spatially separated. In a more specific version of this general embodiment, there system further comprises one or more micro devices, the one or more micro devices being arranged for spatial manipulation by the trapping means, such as the trapping means enabling control over translational movement in three dimensions and rotational movement around at least two axes of the one or more micro devices. One or more of the microdevices may be arranged for receiving the modulated targeting electromagnetic radiation and furthermore shaping, focusing, redirecting and/or changing the modulated targeting electromagnetic radiation from farfield to nearfield.

To sum up, the present invention relates to a system 100 for independently holding and manipulating one or more microscopic objects 158 and for targeting at least a part of the one or more microscopic objects within a trapping volume 102 with electromagnetic radiation 138. The system comprises trapping means for holding and manipulating the one or more microscopic objects and electromagnetic radiationtargeting means (116). The light means comprising a light source and a spatial light modulator which serve to modify the light from the light source so as to enable specific illumination of at least a part of the one or more microscopic objects. The trapping means and the electromagnetic radiation targeting means (116) are enabled to function independently of each other, so that the trapped objects may be moved around without taking being dependent on which parts are being targeted and vice versa.

In exemplary embodiments E1-E15, the invention may relate to:
  E1. A system (100) for independently holding and manipulating a plurality of microscopic objects (158) and for targeting at least a part of the one or more microscopic objects within a trapping volume (102) with electromagnetic radiation (138), the system comprising
    trapping means (142, 128, 130, 158, 160) for holding and manipulating the plurality of microscopic objects within the trapping volume,
    electromagnetic radiation targeting means (116), the electromagnetic radiation targeting means comprising
      a targeting electromagnetic radiation source (118) for emitting targeting electromagnetic radiation (132),
      a primary spatial electromagnetic radiation modulator (120) for receiving and spatially shaping the targeting electromagnetic radiation so as to generate modulated targeting electromagnetic radiation (136) directed towards at least a part of the plurality of microscopic objects so as to enable specifically targeting at least a part of the plurality of microscopic objects within the trapping volume,
wherein the trapping means and the electromagnetic radiation targeting means (116) are enabled to function independently of each other, and wherein the electromagnetic radiation targeting means enables independently targeting at least two spatially different microscopic objects, and wherein the trapping means and the electromagnetic radiation targeting means are spatially separated.

E2. A system according to embodiment E1, wherein the trapping means comprises a trapping spatio-temporal unit enabling varying the position of the plurality of microscopic objects, and wherein the trapping spatio-temporal unit and the primary electromagnetic radiation modulator are spatially separated.

E3. A system according to embodiment E1, wherein the trapping means is an optical trapping means comprising
  a trapping electromagnetic radiation source for emitting trapping electromagnetic radiation,
  a secondary spatial electromagnetic radiation modulator for receiving and spatially shaping the trapping electromagnetic radiation so as to generate modulated trapping electromagnetic radiation which may be directed towards the one or more microscopic objects.

E4. A system according to embodiment E3, wherein the primary spatial electromagnetic radiation modulator and the secondary spatial electromagnetic radiation modulators are physically separated.

E5. A system according to embodiment E1, wherein the primary spatial electromagnetic radiation modulator applies a spatial modulation of the incident electromagnetic radiation by changing its properties locally, such as an electrically or optically addressed spatial light modulator.

E6. A system according to embodiment E1, wherein the electromagnetic radiation targeting means is enabling targeting, such as focusing, at least two spatially different microscopic objects, where the spatially different microscopic objects may be positioned at spatially different focal planes with respect to an optical axis of the electromagnetic radiation targeting means.

E7. A system according to embodiment E6, wherein the position of at least one of the focal planes with respect to an optical axis of the electromagnetic radiation targeting means may be changed.

E8. A system according to embodiment E7, wherein the position of at least one of the focal planes with respect to an optical axis may be changed so as to move from one side of a microscopic object being trapped by the trapping system to the other side of a microscopic object being trapped by the trapping system along an optical axis of the electromagnetic radiation targeting means.

E9. A system according to embodiment E1, further comprising
  sensing means arranged for determining the position, such as the position and orientation, of the one or more microscopic objects.

E10. A system according to embodiment E3, wherein the modulated trapping electromagnetic radiation and the modulated targeting electromagnetic radiation have different wavelengths, such as the wavelength of the modulated trapping electromagnetic radiation being 1064 nm and the wavelength of the modulated targeting electromagnetic radiation being 532 nm.

E11. A system according to embodiment E1, wherein the system further comprises one or more micro devices, the one or more micro devices
  being arranged for spatial manipulation by the trapping means, such as the trapping means enabling control over translational movement in three dimensions and rotational movement around at least two axes of the one or more micro devices, and
  being arranged for receiving the modulated targeting electromagnetic radiation and furthermore shaping, focusing, redirecting and/or changing the modulated targeting electromagnetic radiation from farfield to nearfield.

E12. A system according to embodiment E1, wherein the system further comprises one or more micro devices, wherein the one or more micro devices are each arranged for holding a microscopic optical element, such as a spherical bead.

E13. A system according to embodiment E1, wherein the system further comprises
  an electromagnetic radiation detector arranged for receiving electromagnetic radiation emitted from within the trapping volume, such as emitted from the one or more microscopic objects, such as emitted from within the trapping volume and traversing the primary electromagnetic radiation modulator.

E14. A method for independently holding and/or manipulating one or more microscopic objects and for targeting at least a part of the one or more microscopic objects within a trapping volume (102) with electromagnetic radiation (138), the method comprising
  trapping the one or more microscopic objects within the trapping volume by using a trapping means (142, 128, 130, 158, 160),
  receiving and spatially shaping targeting electromagnetic radiation so as to generate modulated targeting electromagnetic radiation (136) directed towards at least a part of the one or more microscopic objects so as to specifically target at least a part of the one or more microscopic objects within the trapping volume by using an electromagnetic radiation targeting means (116),
wherein the trapping means and the electromagnetic radiation targeting means (116) are enabled to function independently of each other, and wherein the electromagnetic radiation targeting means enables independently targeting at least two spatially different microscopic objects, and wherein the trapping means and the electromagnetic radiation targeting means are spatially separated.

E15. Use of a system according to embodiment E1 for independently holding and manipulating one or more microscopic objects (158) and for targeting at least a part of the one or more microscopic objects within a trapping volume (102) with electromagnetic radiation (138).

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A system for independently holding and manipulating a plurality of microscopic objects and for targeting at least a part of one or more microscopic objects within a trapping volume with electromagnetic radiation, the system comprising:
  an optical trapping system for holding and manipulating the plurality of microscopic objects comprising:
    a trapping electromagnetic radiation source for emitting trapping electromagnetic radiation, a secondary spatial electromagnetic radiation modulator for receiving and spatially shaping the trapping electromagnetic radiation so as to generate modulated trapping electromagnetic radiation which may be directed towards the plurality of microscopic objects, an electromagnetic radiation generator, the electromagnetic radiation generator comprising:

a targeting electromagnetic radiation source for emitting targeting electromagnetic radiation, and a primary spatial electromagnetic radiation modulator for receiving and spatially shaping the targeting electromagnetic radiation so as to generate modulated targeting electromagnetic radiation directed towards at least a part of the plurality of microscopic objects so as to enable specifically targeting at least a part of the plurality of microscopic objects within the trapping volume, wherein the optical trapping system and the electromagnetic radiation generator are enabled to function independently of each other, and wherein the electromagnetic radiation generator enables independent and simultaneous targeting of at least two spatially different microscopic objects, and wherein the optical trapping system and the electromagnetic radiation generator are spatially separated, and wherein the electromagnetic radiation generator is not able to overcome the forces applied by the optical trapping system so that a microscopic object, which is trapped by the optical trapping system, will remain trapped regardless of the actions of the electromagnetic radiation generator, and wherein the modulated targeting electromagnetic radiation is not able to optically trap the microscopic objects.

2. The system according to claim 1, wherein the optical trapping system is enabling trapping at least two spatially different microscopic objects, wherein the spatially different microscopic objects may be positioned at spatially different planes with respect to an optical axis of the trapping means.

3. The system according to claim 1, wherein the electromagnetic radiation generator is enables targeting or focusing on, at least two spatially different microscopic objects, wherein the spatially different microscopic objects may be positioned at spatially different planes with respect to an optical axis of the electromagnetic radiation generator.

4. The system according to claim 1, wherein the optical trapping system enables independently trapping at least 100 microscopic objects.

5. The system according to claim 1, wherein the electromagnetic generator enables independently targeting at least 100 microscopic objects.

6. The system according to claim 1, wherein the modulated trapping electromagnetic radiation and the modulated targeting electromagnetic radiation have different wavelengths or the wavelength of the modulated trapping electromagnetic radiation is 1064 nm and the wavelength of the modulated targeting electromagnetic radiation is 532 nm.

7. The system according to claim 1, wherein the optical trapping system comprises a trapping spatio-temporal unit enabling varying of the position of the plurality of microscopic objects, and wherein the trapping spatio-temporal unit and the primary electromagnetic radiation modulator are spatially separated.

8. The system according to claim 1, wherein the primary spatial electromagnetic radiation modulator and the secondary spatial electromagnetic radiation modulator are physically separated.

9. The system according to claim 1, wherein the primary spatial electromagnetic radiation modulator is arranged for applying a spatial modulation of the targeting electromagnetic radiation by changing its properties locally.

10. The system according to claim 1, wherein the secondary spatial electromagnetic radiation modulator is arranged for applying a spatial modulation of the trapping electromagnetic radiation by changing its properties locally.

11. The system according to claim 2, wherein the position of at least one of the planes with respect to an optical axis of the optical trapping system may be changed.

12. The system according to claim 3, wherein the position of at least one of the planes with respect to an optical axis of the electromagnetic radiation generator may be changed.

13. The system according to claim 12, wherein the position of at least one of the planes with respect to an optical axis may be changed so as to move from one side of a microscopic object being trapped by the optical trapping system to the other side of a microscopic object being trapped by the optical trapping system along an optical axis of the electromagnetic radiation generator.

14. The system according to claim 1, further comprising:
a sensor that determines the position and/or orientation, of the plurality of microscopic objects.

15. The system according to claim 1, wherein the system further comprises one or more micro devices, wherein the one or more micro devices:
are arranged for spatial manipulation by the optical trapping system or the optical trapping system enables control over translational movement in three dimensions and rotational movement around at least two axes of the one or more micro devices, and
are arranged for receiving the modulated targeting electromagnetic radiation and furthermore shaping, focusing, redirecting the modulated targeting electromagnetic radiation and/or changing the modulated targeting electromagnetic radiation from farfield to nearfield.

16. The system according to claim 1, wherein the system further comprises one or more micro devices and, wherein the one or more micro devices are each arranged for holding a microscopic optical element or a spherical bead.

17. The system according to claim 1, wherein the system further comprises:
an electromagnetic radiation detector arranged for receiving electromagnetic radiation emitted from within the trapping volume, or emitted from the one or more microscopic objects.

18. The system according to claim 1, wherein any one of the optical trapping system and/or the electromagnetic radiation generator comprises a setup relying on a Generalized Phase Contrast.

19. A method for independently holding and/or manipulating one or more microscopic objects and for targeting at least a part of the one or more microscopic objects within a trapping volume with electromagnetic radiation, the method comprising:
trapping the one or more microscopic objects within the trapping volume by using optical trapping system, comprising:
a trapping electromagnetic radiation source for emitting trapping electromagnetic radiation,
a secondary spatial electromagnetic radiation modulator for receiving and spatially shaping the trapping electromagnetic radiation so as to generate modulated trapping electromagnetic radiation, which may be directed towards the plurality of microscopic objects,
receiving and spatially shaping targeting electromagnetic radiation using an electromagnetic radiation generator, the electromagnetic radiation generator comprising:

a targeting electromagnetic radiation source for emitting targeting electromagnetic radiation, a primary spatial electromagnetic radiation modulator for receiving and spatially shaping the targeting electromagnetic radiation so as to generate modulated targeting electromagnetic radiation directed towards at least a part of the plurality of microscopic objects so as to enable specifically targeting at least a part of the plurality of microscopic objects within the trapping volume, so as to generate modulated targeting electromagnetic radiation directed towards at least a part of the one or more microscopic objects so as to specifically target at least a part of the one or more microscopic objects within the trapping volume by using an electromagnetic radiation generator, wherein the optical trapping system and the electromagnetic radiation generator are enabled to function independently of each other, and wherein the electromagnetic radiation generator enables independently and simultaneously targeting of at least two spatially different microscopic objects, and wherein the optical trapping system and the electromagnetic radiation generator are spatially separated, and wherein the electromagnetic radiation generator is not able to overcome the forces applied by the optical trapping system so that a microscopic object which is trapped by the optical trapping system will remain trapped regardless of the actions of the electromagnetic radiation generator, and wherein the modulated targeting electromagnetic radiation is not able to optically trap the microscopic objects.

* * * * *